United States Patent [19]

Esposito

[11] Patent Number: 4,821,185

[45] Date of Patent: Apr. 11, 1989

[54] I/O INTERFACE SYSTEM USING PLURAL BUFFERS SIZED SMALLER THAN NON-OVERLAPPING CONTIGUOUS COMPUTER MEMORY PORTIONS DEDICATED TO EACH BUFFER

[75] Inventor: Daniel Esposito, Lisle, Ill.

[73] Assignees: American Telephone and Telegraph Company, New York, N.Y.; AT&T Information Systems Inc., Morristown, N.J.

[21] Appl. No.: 864,835

[22] Filed: May 19, 1986

[51] Int. Cl.⁴ .............................................. G06F 3/00
[52] U.S. Cl. ................................. 364/200; 364/238.3
[58] Field of Search ... 364/200 MS File, 900 MS File

[56] References Cited

U.S. PATENT DOCUMENTS

| | | | |
|---|---|---|---|
| 3,618,041 | 11/1971 | Horikoshi | 364/200 |
| 3,699,532 | 10/1972 | Schaffer et al. | 364/200 |
| 3,723,976 | 3/1973 | Alvarez et al. | 364/200 |
| 3,840,863 | 10/1974 | Fugua et al. | 364/200 |
| 3,914,747 | 10/1975 | Barnes et al. | 364/200 |
| 4,040,026 | 8/1977 | Gernelle | 364/200 |
| 4,041,473 | 8/1977 | Bardotti et al. | 364/200 |
| 4,075,686 | 2/1978 | Calle et al. | 364/200 |
| 4,075,691 | 2/1978 | Davis et al. | 364/200 |
| 4,115,851 | 9/1978 | Nagano et al. | 364/200 |
| 4,246,637 | 1/1981 | Brown et al. | 364/200 |
| 4,287,562 | 9/1981 | Darden et al. | 364/200 |
| 4,313,160 | 1/1982 | Kaufman et al. | 364/200 |
| 4,346,439 | 8/1982 | Huno et al. | 364/200 |
| 4,371,929 | 2/1983 | Brann et al. | 364/200 |
| 4,394,733 | 7/1983 | Swenson | 364/200 |
| 4,399,503 | 8/1983 | Hawley | 364/200 |
| 4,442,488 | 4/1984 | Hall | 364/200 |
| 4,453,216 | 6/1984 | Chiba et al. | 364/200 |
| 4,454,595 | 6/1984 | Cage | 364/900 |
| 4,473,878 | 9/1984 | Zolnowsky et al. | 364/200 |
| 4,490,782 | 12/1984 | Dixon et al. | 364/200 |
| 4,511,964 | 4/1985 | Georg et al. | 364/200 |
| 4,542,457 | 9/1985 | Mortensen et al. | 364/200 |
| 4,549,263 | 10/1985 | Calder | 364/200 |
| 4,571,671 | 2/1986 | Burns et al. | 364/200 |
| 4,591,973 | 5/1986 | Ferris, III et al. | 364/200 |
| 4,592,011 | 5/1986 | Mantellina et al. | 364/900 |
| 4,669,043 | 5/1987 | Kaplinsky | 364/200 |
| 4,777,595 | 10/1988 | Strecker et al. | 364/200 |

OTHER PUBLICATIONS

Alliant FX/Series Product Summary, Jun. 1985, Alliant Computer Systems Corp, Acton, Mass., pp. 1-3 and 3-8 to 3-11.

VAX-11/780 Unibus Subsystem, Digital Equipment Corporation Manual, pp. 246-307.

IBM Systems Reference Library, File No. S360-01, Order No. GA22-6821-8 "IBM System/360 Principles of Operation", pp. 84-121.4.

W. Hugelshofer et al. "Cache Buffer for Disk Accelerates Minicomputer Performance", *Electronics*, 2/10/82, pp. 155-159.

Primary Examiner—Raulfe B. Zache
Assistant Examiner—Danh Phung
Attorney, Agent, or Firm—David Volejnicek

[57] ABSTRACT

An I/O interface (24) couples a plurality of I/O devices (29) to a main memory (22) by way of a system bus (23). The I/O interface includes a plurality of buffer blocks (110) permanently associated with one or more memory pages (240). Each page is contiguous within the memory address spectrum and includes a plurality of memory blocks (230). Under control of a sequencer (125), the buffer blocks temporarily store data items being transferred between the memory and the devices. Data items being transferred between any and all devices and a particular memory page are temporarily stored by that page's associated buffer block and no other buffer block. The sequencer accumulates in a buffer block a plurality of data items being transferred by a device to memory by successive write requests, and causes a direct memory access (DMA) conveyance of the buffer contents to the memory upon occurrence of any one of a number of events. In response to a device read request, the sequencer prefetches by DMA access from the memory into a buffer a block of data items that includes the requested data item. Until occurrence of any one of a number of events, the sequencer satisfies successive read requests made by that same device from the buffer contents.

35 Claims, 16 Drawing Sheets

FIG. 18

| COUNT | WORD BYTE PORTION "00" | "01" | "10" | "11" |
|---|---|---|---|---|
| 16=0 | Q | | | |
| 1 | B 0 | ERROR | ERROR | ERROR |
| 2 | H 0 | B 0, B 1 | | B 0, B 1 |
| 3 | H 0 | B 0, H 1 | H 0 | B 0, H 1 |
| 4 | B 2, W 0 | B 0, H 1, B 3 | H 0, B 2 | B 0, H 1, B 3 |
| 5 | B 4, W 0 | B 0, H 1, H 3 | H 0, B 2 | B 0, H 1, H 3 |
| 6 | H 4, B 6, W 0 | B 0, H 1, H 3, B 5 | H 0, H 2, B 6 | B 0, H 1, H 3, B 5 |
| 7 | H 4, B 8, W 0 | B 0, H 1, H 3, B 7 | H 0, H 2, H 6 | B 0, H 1, H 3, W 5 |
| 8 | H 4, H 8, W 0 | B 0, H 1, H 3, H 7 | H 0, H 2, H 6, B 8 | B 0, H 1, H 3, W 5 |
| 9 | W 4, H 8, W 0 | B 0, H 1, H 3, W 7 | H 0, H 2, H 6, B 8 | B 0, H 1, H 3, W 5, B 9 |
| 10 | W 4, H 8, W 0 | B 0, H 1, H 3, W 7 | H 0, H 2, H 6, H 8 | B 0, H 1, H 3, W 5, H 9 |
| 11 | W 4, B 8, W 0 | B 0, H 1, H 3, W 7, B 11 | H 0, H 2, H 6, H 10 | B 0, H 1, H 3, W 5, H 9 |
| 12 | W 4, B 8, B 12, W 0 | B 0, H 1, H 3, W 7, H 11 | H 0, H 2, H 6, H 10 | B 0, H 1, H 3, W 5, H 9, B 11 |
| 13 | W 4, H 8, B 12, W 0 | B 0, H 1, H 3, W 7, H 11 | H 0, H 2, H 6, H 10, B 12 | B 0, H 1, H 3, W 5, H 9, H 11 |
| 14 | W 4, H 8, H 12, W 0 | B 0, H 1, H 3, W 7, H 11, B 13 | H 0, H 2, H 6, H 10, H 12 | ERROR |
| 15 | W 4, H 8, B 12, B 14, W 0 | B 0, H 1, H 3, W 7, W 11 | ERROR | ERROR |

I/O INTERFACE SYSTEM USING PLURAL BUFFERS SIZED SMALLER THAN NON-OVERLAPPING CONTIGUOUS COMPUTER MEMORY PORTIONS DEDICATED TO EACH BUFFER

BACKGROUND OF THE INVENTION

1. Field of the Invention

This invention relates generally to input and output (I/O) subsystems of processing systems, and relates particularly to an interface for coupling I/O devices to a processing system and for buffering data transfers between the I/O devices and the processing system.

2. Description of the Related Art

Data transfers that typical I/O devices are capable of performing are generally slow and piecemeal relative to data transfers that can be performed by other portions of a processing system, such as a CPU or a main memory. To the extent that these other portions must wait on or participate in I/O data transfers, the transfers adversely impact the performance of the processing system. The art therefore needs a mechanism to improve the speed and size of I/O transfers, in order to improve processing system performance. For cost reasons, it is desirable that this mechanism be simple and that its use be shared by a plurality of I/O devices.

SUMMARY OF THE INVENTION

The present invention is directed to meeting this need of the art, and to solving this and other disadvantages of the prior art. According to the invention, an I/O interface unit for connecting a plurality of I/O devices to a communication medium, such as a bus of a processing system, includes a plurality of buffers, connectable through a first port to the plurality of devices and connectable through a second port to the medium, for temporarily storing information being transferred between the ports, wherein each buffer is associated with a different contiguous portion of an address spectrum, stores information having addresses included in the associated spectrum portion, and has a storage size smaller than a storage size spanned by the associated spectrum portion. Illustratively, each buffer has a storage size of a block of memory words and is associated with one or more mutually non-contiguous memory pages each comprising a plurality of blocks of memory words.

A processing system arranged according to the invention has a plurality of devices connected by an I/O interface unit to a memory that has a plurality of non-overlapping portions—illustratively pages—, each contiguous and for storing information identified therewith. The I/O interface unit includes a plurality of buffers for temporarily storing information being transferred between the devices and the memory, wherein each buffer is associated with a different memory portion, stores information identified with the associated memory portion, and has a storage size smaller than the associated memory portion.

Use of the I/O interface with buffering capability allows data transfers to be made between the devices and the I/O interface at the transfer speed of, and in the manner known to, the devices, separately from transfers between the I/O interface and the communication medium and system components connected to the medium. This separation allows the speed and mode of transfers between the I/O interface and the medium, and system components connected thereto, to be matched to the speed and mode supported by the medium and the system components connected thereto, regardless of the maximum transfer speed or best transfer manner known to the devices. For example, transfers between a device and the I/O interface may be slow byte-wide or word-wide transfers, whereas transfers between the I/O interface and the medium may be high-speed block transfers. System performance is thereby improved.

Since a buffer is associated with an address spectrum or memory portion, as opposed to being associated with a device, conflicting information transfers, i.e., simultaneous transfers by a plurality of devices to or from the same memory addresses, lead to attempts by a plurality of devices simultaneously to use one buffer. Conflicting transfers are therefore easily detected, without need for extensive monitoring and detection circuitry. Yet this arrangement allows a plurality of devices to share use of the buffers. Also, since the contiguous storage area associated with a buffer is larger than the buffer storage area, as opposed to being no greater in size as is common with buffering arrangements such as conventional cache memories, sequential access by a device to a storage area of a memory or address spectrum portion larger than the associated buffer size results in reuse of the same buffer, as opposed to use of different buffers. Accesses by I/O devices are indeed expected generally to be sequential; there is thus implemented in the I/O interface a "most recently used" buffer replacement mechanism. This is in contrast with the "least recently used" buffer replacement mechanism which is used in mainstore/CPU cache buffering arrangements. A storage area of a memory or address spectrum just accessed by a device is expected generally to be the least likely area to be accessed again by the device in the near future; unlike the CPU cache buffering arrangements, the present buffering arrangement is therefore well suited for use in an I/O interface.

The I/O interface includes a control arrangement—illustratively a sequencer—that responds to receipt from a device of information identified with a memory or spectrum portion and stores the information in the buffer associated with that memory or spectrum portion. At some time thereafter, the control arrangement conveys the stored information to the memory. Illustratively, the information comprises a plurality of items of information which the control arrangement receives successively, as opposed to simultaneously, from a device, and the control arrangement successively stores the information in the buffer. Thereafter the control arrangement conveys simultaneously a plurality of the stored items to the memory.

The control arrangement further responds to receipt of a request from a device for information from memory and identified with a memory portion or address spectrum portion, and both stores the information in the buffer associated with that memory or spectrum portion and conveys the information to the requesting device. Illustratively, the request is for an item of information, and the control arrangement responds by obtaining simultaneously from the memory and storing in the buffer a plurality of items of information identified with the memory or spectrum portion and including the requested item. The control arrangement then conveys the requested item from the buffer to the requesting device. The control arrangement responds to receipt of a successive request by a device for an information item from the memory which is stored in the buffer by retrieving from the buffer and conveying to the requesting device the requested item.

Accumulation or concentration by the I/O interface of a plurality of device data transfers into fewer data transfers across the medium to memory results in fewer and faster I/O initiated accesses to memory than would otherwise exist. This serves to improve the performance of the system. The same is true of the prefetching of a plurality of data items from memory by the I/O interface in response to a device request for one data item, followed by satisfying from the I/O interface successive requests by a device for data items that are included among the prefetched items. Both of these operational improvements take advantage of the expectation that successive data transfers between an I/O device and memory are of data identified with the same memory or spectrum portion, and are sequential. Furthermore, that data items are prefetched—obtained before being requested—by the I/O interface from memory but not from I/O devices allows the I/O interface to be used with non-storage I/O devices, such as terminal keyboards, as prefetching generally cannot be done from non-storage devices.

Preferably, the control arrangement stores in a buffer information received from one device and identified with the associated memory portion until occurrence of a particular event, and responds to occurrence of the event by "flushing" the buffer, i.e., causing transfer of the stored information from the buffer to the associated memory portion. The particular event may be, for example, (a) receipt b the I/O interface from a different device of information identified with the memory portion, (b) request by a device from the memory of information identified with the memory portion, (c) the buffer running out of storage space available to store information received from the device and identified with the associated memory portion, (d) elapsing of a predetermined period of time from commencement of storing in the buffer of any information currently stored therein, (e) receipt from the device of information identified with a different memory portion, or (f) receipt from the device of information identified with the memory portion, but for storing in the memory non-contiguously with the information stored in the buffer.

Similarly, the control arrangement conveys to the requesting device information from the memory requested by that device and stored in the buffer until occurrence of a particular event and responds to occurrence of the event by "invalidating" the buffer, i.e., clearing the buffer of stored information. The particular event may be, for example, (a) receipt by the interface from the device of information identified with that memory portion, (b) receipt by the interface from a different device of a request for information identified with the memory portion, (c) conveyance to the device of all information stored in the buffer, (d) elapsing of a predetermined period of time from commencement of storing in the buffer of any information currently stored therein, (e) receipt by the interface from the device of a request for information from the memory identified with a different memory portion, or (f) receipt by the interface from the device of a request for information from the memory but stored in the memory non-contiguously with the last information conveyed to the one device from the buffer.

The functionality of the control arrangement—in particular that prefetching from memory is done automatically in response to device requests for information, that information transfers from a device to memory are automatically collected and grouped into block transfers to memory, and that invalidating and flushing of buffers is also done automatically on occurrence of certain conditions and without special prompts or assistance from either the I/O devices or other system components—makes the I/O interface "transparent" to the I/O devices and other system components. The I/O devices and other system components do not need to be made aware of the existence of the I/O interface and do not need to take account of its existence in their normal operation. The I/O interface is therefore easily integrated into processing systems, and is even easily retrofitted into pre-existing systems.

These and other advantages and features of the present invention will become apparent from the following description of an illustrative embodiment of the invention taken together with the drawing.

BRIEF DESCRIPTION OF THE DRAWING

FIG. 18 is a tabular representation of the subprocedure branches of the procedure of FIG. 17.

DESCRIPTION OF THE PREFERRED EMBODIMENT

Figure 1:
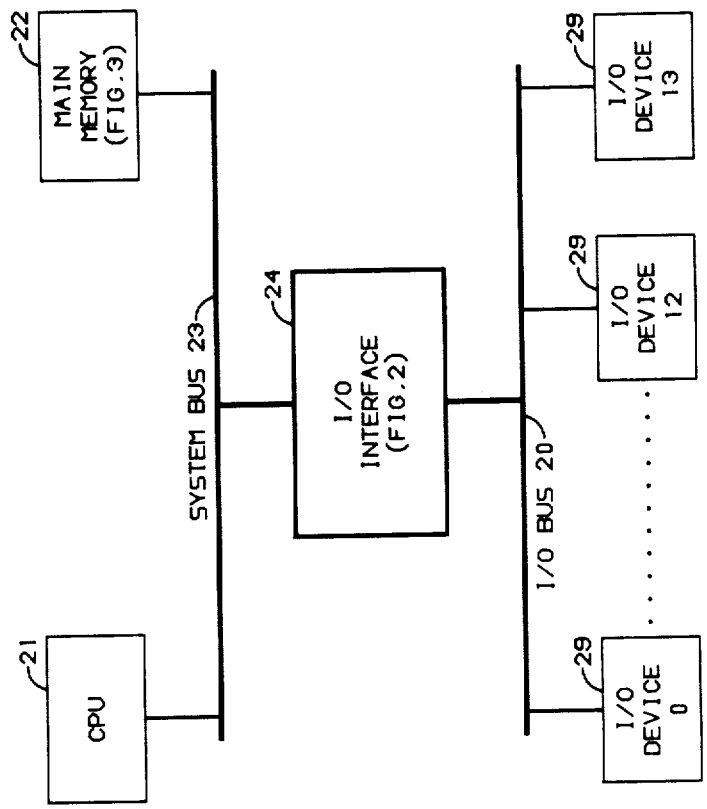
FIG. 1 is a block diagram of a processing system embodying an illustrative example of the invention.

FIG. 1 shows an illustrative processing system, that includes an embodiment of the invention. The processing system is, for example, a computer, and includes at least one central processing unit (CPU) 21, a main memory 22, and an input and output (I/O) interface 24 interconnected by a communication medium such as a system bus 23. CPU 21, memory 22, and system bus 23 are conventional system components.

The system further includes a plurality of I/O devices 29 interconnected by an I/O bus 20. Bus 20 couples devices 29 to interface 24. In this illustrative embodiment, there are fourteen devices 29 having identifiers (IDs) 0 through 13. Devices 29 and bus 20 are also conventional. Devices 29 include, for example, terminals, printers, disk drives, and RS-232 port interfaces, and their associated controllers.

Interface 24 connects bus 20 to bus 23 to enable devices 29, CPU 21, and memory 22 to communicate with each other. Interface 24 hides from CPU 21, memory 22, and devices 29 the fact that they are not connected to the same bus. Except for system configuration-type functions, interface 24 is transparent to CPU 21, memory 22, and devices 29: they need not be aware of its existence for purposes of their operation in performing their tasks. Interface 24 monitors communications on buses 23 and 20 and, subsequent to detecting a communication on one bus intended for a system component connected to the other bus, it transfers the communication from the one bus to the other.

CPU 21 writes information into, and reads information from, memory 22 directly via conventional instructions. CPU 21 also has the capability of moving data between itself and devices 29 by means of instructions such as MOVE. Hence, CPU 21 can transfer information between a device 29 and memory 22 by performing two transfers, one between itself and a device 29 and the other between itself and memory 22. This is inefficient, as it takes two bus transfer cycles to perform the one device-memory transfer, and the CPU 21 must be actively involved in both transfer cycles. Therefore, CPU 21 generally causes data transfers between memory 22 and devices 29 to take place by means of directing devices 29 to execute data transfer jobs. CPU 21 does this, for example, by storing information necessary for execution of a job in areas of memory 22 designated to serve as job queues for devices 29. Devices 29 periodically read their job queues and respond to jobs indicated therein by reading or writing memory 22, as dictated by each job.

A function of interface 24 is to improve the efficiency of data transfers between memory 22 and devices 29 in order to improve the overall operating efficiency of the system of FIG. 1. Need for this function arises as a consequence of disparity of size and speed of information transfers that devices 29 and bus 20 are capable of performing as compared to those that CPU 21, memory 22, and bus 23 are capable of performing. Buses 20 and 23 are any suitable communication media each with its own communication protocol. However, for purposes of this illustrative example, it is assumed that bus 20 is a relatively slow communication medium and is capable of transferring simultaneously up to a word of data. But bus 23 is a fast communication medium and is capable of transferring simultaneously blocks of data of up to four memory words in size.

In transferring data between buses 20 and 23, interface 24 matches the size and speed of each transfer to the capabilities of each bus 20 and 23. Interface 24 performs DMA transfers on bus 23 on behalf of devices 29. Interface 24 also performs other transfer efficiency-improving functions, as will become clear from the following description of the structure and operation of interface 24.

Figure 2:
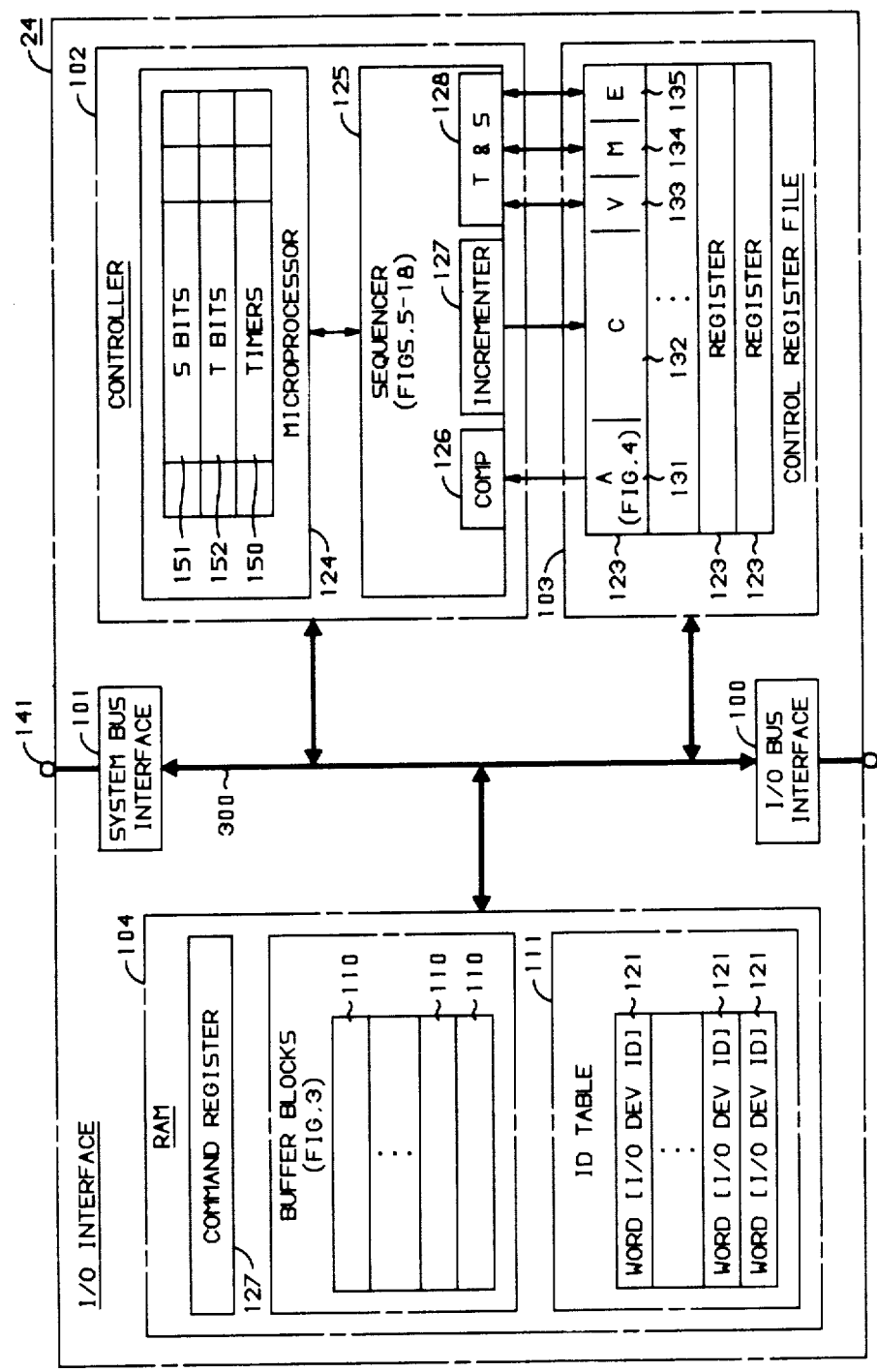
FIG. 2 is a block diagram of the I/O interface of the system of FIG. 1.

FIG. 2 shows the internal structure of interface 24. Interface 24 connects to buses 23 and 20 at ports 141 and 140, respectively. Interface 24 includes a system bus interface 101 and an I/O bus interface 100 connected to ports 141 and 140, respectively. Both interfaces 100 and 101 are substantially conventional components which enable interface 24 to communicate on the respective buses by converting communications between format used internally by interface 24 and format used by the respective buses, and also by carrying on communications on the respective buses on behalf of interface 24 according to the communication protocols of the respective buses.

Interface 24 further includes a random access memory (RAM) 104 which serves, inter alia, as temporary storage for most communications being transferred by interface 24 between buses 20 and 23, a controller 102 that performs the operational functions of interface 24, and a control register file 103 that stores control information needed by controller 102 to perform its functions.

The various elements 100–104 are interconnected by communication paths 300. While paths 300 may comprise a single communication bus, for speed of operation of interface 24 it is desirable that components 100–104 be interconnected by a plurality of buses each dedicated to carrying on particular information between two or more of components 100–104, or sub-components thereof. Such busing structure is a function of the selected implementation of interface 24 and lies within the skill of the art. It has no bearing on the claimed invention and would tend to confuse the discussion of the structure and operation of interface 24. Therefore, only generalized path or paths 300 will be referred to in the subsequent discussion.

RAM 104 includes a plurality of buffer blocks 110. Buffer blocks 110 are individual buffers that serve as temporary storage for data being written into memory 22 or being read out of memory 22 by devices 29. Buffer blocks 110 have a certain fixed relationship, or association, with the address spectrum of memory 22. This relationship is illustrated in FIG. 3.

Figure 3:
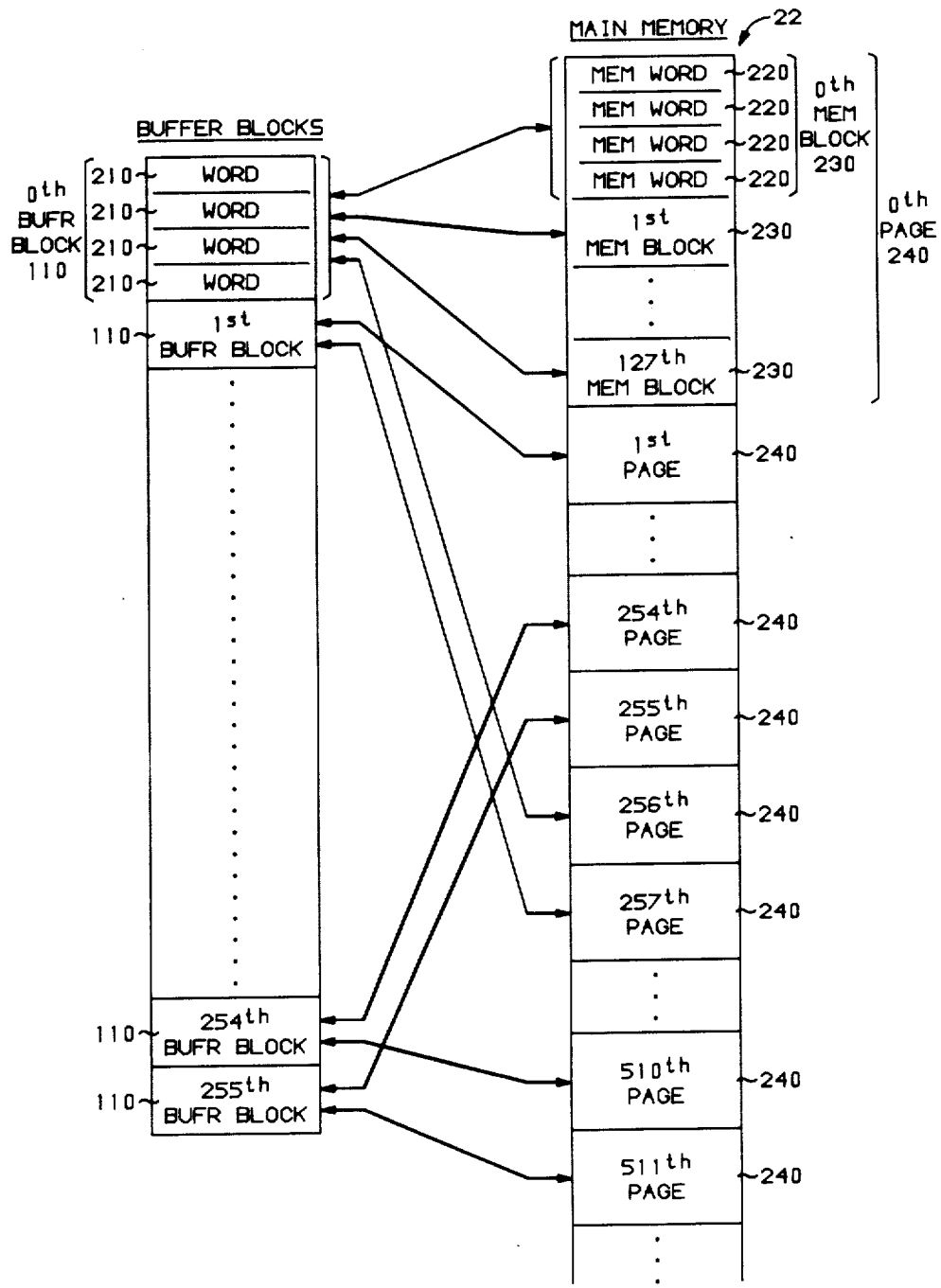
FIG. 3 is a block diagram showing layouts of the memory of the system of FIG. 1 and the buffer blocks of the I/O interface of FIG. 2 and the relationship therebetween.

Memory 22 is laid out as shown on the right-hand side of FIG. 3. Memory 22 comprises a plurality of addressable locations, illustratively words 220, each for storing data identified with—for example, accompanied by—the location's address. Memory 22 is divided into a plurality of non-overlapping contiguous portions, illustratively referred to herein as pages 240. Each page 240 is subdivided into an integral plurality-illustratively 128—of contiguous memory blocks 230. Each memory block 230 includes four contiguous memory words 220. "Contiguous" as used herein does not mean physically contiguous; for example, memory 22 may be interleaved. "Contiguous" as used herein means contiguous within the memory address spectrum: two addressable entities are contiguous when they have associated therewith addresses that are contiguous—sequentially adjacent—in the memory spectrum. For example, two contiguous memory words 220 have associated therewith adjacent addresses within the memory address spectrum. A page 240 is thus spanned by a contiguous portion of the memory address spectrum, as is a block 230.

Figure 4:
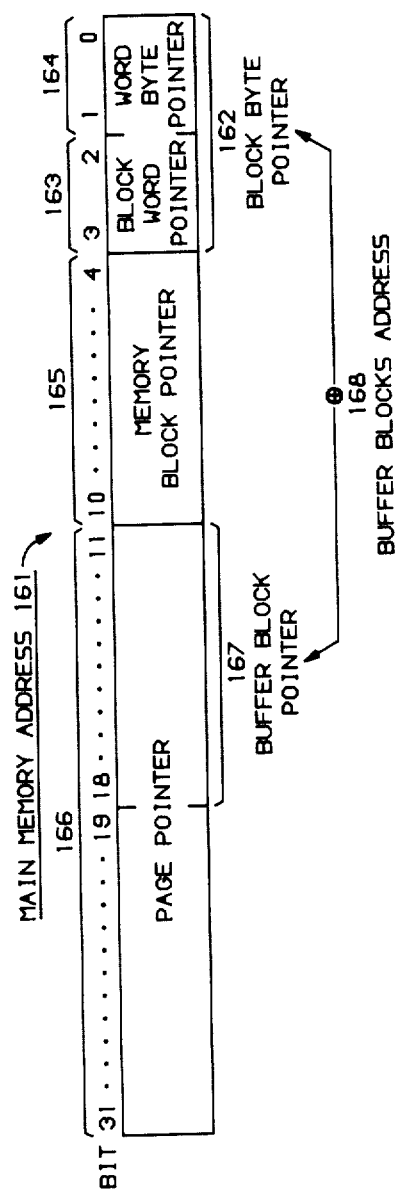
FIG. 4 is a block diagram of an address of the memory of the system of FIG. 1.

Buffer blocks 110 of interface 24 are shown on the left-hand side of FIG. 3. Each buffer block 110 is associated with a different plurality of non-contiguous pages 240. If, for example, there are 256 buffer blocks 110, as shown in FIG. 4, then preferably each 256th page 240 of memory 22 is associated with the same buffer block 110. All memory blocks 230 of a page 240 associated with a buffer block 110 are mapped into that buffer block 110. Each buffer block 110 comprises four words 210 of RAM memory. Each buffer block 110 therefore has a storage size equal to that of a memory block 230. Sequential words 220 of each memory block 230 map into sequential words 210 of associated buffer block 110.

As will be made clear further below, the memory 22-to-buffer block 110 relationship just described insures "collision" (i.e., accessing of same buffer block 110), and therefore detection at interface 24, of simultaneous accesses by a plurality of devices 29 to th same memory block 230. However, successive data transfers between memory 22 and a device 29 are expected generally to be sequential, i.e., to the same page 240, and different devices 29 are expected generally to be accessing different pages 240. Hence, the defined relationship is likely to yield a minimum number of collisions. The relationship also serves to implement a "most recently used" replacement technique for the contents of buffer blocks 110. The value of the "most recently used" replacement technique is based on the assumption that a memory block 230 of data most recently transferred between a device 29 and memory 22 is the least likely memory block of data to be transferred again in the forseeable future.

The layout of memory 22 and buffer blocks 110 and the relationship therebetween discussed in conjunction with FIG. 3 is reflected in each main memory address 161, one of which is graphically depicted in FIG. 4. Address 161 is illustratively a 32-bit address. The least significant four address bits 0–3 serve as a block byte pointer 162, identifying individual bytes of both buffer blocks 110 and memory blocks 230. The most significant two bits of pointer 162 serve as a block word pointer 163, identifying individual words 210 or 220 of blocks 120 or 230, respectively. The other two bits of pointer 162 serve as a word byte pointer 164, identifying individual bits of words 210 or 220.

The next seven address bits 4–10 serve as a memory block pointer 165, identifying individual memory blocks 230 of a page 240. The remaining address bits 11–31 serve as a page pointer 166, identifying individual pages 240 of memory 22. The eight least significant bits 11–18 of pointer 166 serve as a buffer block pointer 167, identifying individual buffer blocks 110. When concatenated, pointers 167 and 162 together serve as an address 168 within the buffer blocks 110.

Choice of the particular bits to serve as buffer block pointer 167 is done for performance reasons. Choice of less significant address bits would interfere with implementation of the "most recently used" replacement technique. And choice of more significant address bits would lead to an increase in the likely number of "collisions". Because typically each different device 29 uses a different page 240 at any one time, the choice of bits 11–18 to serve as pointer 167 is considered to be optimal.

Returning to consideration of FIG. 2, RAM 104 further includes an identification (ID) table 111 having a plurality of memory words 121, one associated with each different buffer block 110. A buffer block's associated word 121 in table 111 holds the ID of device 29 that is currently using that buffer block 110. RAM 104 also includes a command register 127, which allows the CPU 21 to configure interface 24. CPU 21 writes bits of register 127 to control interface 24. For example, CPU 21 uses register 127 to indicate to interface 24 those devices 29 for which interface 24 should buffer data transfers. Additionally, RAM 104 may include one or more status registers (not shown) for allowing CPU 21 to monitor the state of interface 24.

Control register file 103 includes a plurality of registers 123, one associated with each different device 29. A register 123 is divided into a plurality of fields 131–135. Address (A) field 131 holds the memory address at which associated device 29 commenced current reading or writing of memory 22. In this illustrative example, field 131 is 32 bits wide. Count (C) field 132 indicates the number of bytes that have been read or written by associated device 29. In this illustrative example, C field 132 is four bits wide. Fields 133–135 are each a single bit wide. Validity (V) field 133, when set, indicates that data being read by associated device 29 are present in a buffer block 110. Modified (M) field 134, when set, indicates that data being written by associated device 29 are present in a buffer block 110. And enabled (E) field 135, when cleared, indicates that data being transferred to or from associated device 29 are not to pass through buffer blocks 110 but are to be transferred between buses 20 and 23 directly via interfaces 140 and 141.

Controller 102 includes a microprocessor 124 and a sequencer 125. Microprocessor 124 is responsible for performing maintenance functions. Microprocessor 124 responds to contents of command register 127 and configures interface 24 accordingly. For example, microprocessor 124 sets and clears E field 135 of registers 123. In addition, microprocessor 124 provides certain functions in support of operation of sequencer 125. These functions include the following.

Microprocessor 124 monitors interrupt signal lines (not shown) of bus 20. Upon issuance of any CPU interrupt by a device 29, microprocessor 124 requests sequencer 125 to free any buffer block 110 being used by device 29 issuing the interrupt, by either flushing or invalidating that buffer block 110. When buffer block 110 has been freed, microprocessor 124 passes the interrupt to CPU 21. Freeing of buffer block 110 before the interrupt is passed to CPU 21 ensures that an interrupt does not pass any buffered data to CPU 21.

Microprocessor 124 also keeps track of time elapsed since access was last made to each buffer block 110 having either the "associated" (by way of ID table 111 entries) M field 134 or V field 132 set. Timing for buffer block 110 commences anew at the time of most recent, i.e., last, operation on any entry of that buffer block 110. If entries of a buffer block 110 have not been operated upon within a predetermined period of time, microprocessor 124 requests sequencer 125 to either flush or invalidate the entries of that buffer block 110, depending upon whether its M field 134 or V field 132, respectively, of device 29 currently having use of that buffer block 110, is set.

So as not to have to keep timing mechanisms for each one of buffer blocks 110, microprocessor 124 only implements one logical timer 150 per device 29. This is adequate, because each device 29 may use only one buffer block 110 at any one time, and therefore at most only as many buffer blocks 110 as there are devices 29 will have entries that must be timed. Timers 150 need not be physical timers. For example, multiple timers 150 may be maintained via microprocessor 124 software and one physical timer.

Associated with each timer 150 are S and T timer bits 151 and 152, respectively. Upon assigning a device 29 to use a buffer block 110 and accessing the assigned buffer block 110, sequencer 125 sets timer bits 151 and 152 of timer 150 belonging to the device 29 that is the current user of that buffer block 110. Thereafter, each time sequencer 125 accesses that block 110, it sets again the corresponding T timer bit 152. Upon freeing that block 110 from the assigned device 29, sequencer 125 clears that device's S timer bit 151.

Microprocessor 124 periodically checks S timer bits 151. If an S timer bit 151 is set, microprocessor 124 checks the corresponding T timer bit 152. If bit 152 is set, microprocessor 124 clears it, and resets and starts its associated timer 150. If T timer bit 152 is not set, microprocessor 142 checks if associated timer 150 has timed out. If it has not timed out, microprocessor 124 does nothing; but if it has timed out, microprocessor 124 stops timer 150 and requests sequencer 125 to free the affected buffer block 110 from device 29 that is currently using it. As mentioned above, sequencer 125 responds by either flushing or invalidating the entries of the affected buffer block 110.

Sequencer 125 is a finite state machine of conventional design that comprises combinatorial logic implementing the functions shown in FIGS. 5-18. Additionally, it includes a comparator 126 for comparing a memory address received from a device 29 with contents of A field 131 of registers 123, an incrementer 127 for incrementing contents of C field 132 of register 123, and a test and set (T&S) circuit 128 for testing and setting or clearing values of fields 133-135 of registers 123.

Turning now to FIGS. 5-18, they show the operation of interface 24 as implemented by sequencer 125. Sequencer 125 operates as a finite state machine. A very high-level state diagram of this operation is presented in FIG. 5. When not stimulated by an input signal, sequencer 125 is in idle state 500. In state 500, sequencer 125 is responsive to six different inputs, each one of which sends sequencer 125 into a different operational "state" 501-506. In each of "states" 501-506 sequencer 125 performs a procedure to satisfy the requirements of the input signal, and then returns to idle state 500. Receipt by sequencer 125 from interface 100 of a READ or WRITE command causes sequencer 125 to assume state 501 or 502, respectively, and to execute I/O READ procedure of FIGS. 6-8 or I/O WRITE procedure of FIGS. 911, respectively. Receipt from microprocessor 124 of an I/O interrupt notification or a timer timeout signal causes sequencer 125 to assume state 506 or 503, respectively, and to execute INTERRUPT procedure of FIG. 12, or TIMEOUT procedure of FIG. 15, respectively. Receipt by sequencer 125 from interface 101 of a MOVE to device or MOVE to memory command causes sequencer 125 to assume state 504 or 505, respectively, and to execute MOVE READ procedure of FIG. 13, or MOVE WRITE procedure of FIG. 14, respectively. I/O interrupts have highest priority, followed by MOVE instructions, timeouts, and I/O device instructions, in that order.

When a device 29 wishes to obtain an item of data from memory 22, it obtains use of bus 20, according to the protocol of bus 20, and then requests the data item over bus 20. (For purposes of this application, an item of data is the data specified by a device 29 read or write request.) Illustratively, requesting device 29 outputs information on bus 20 that enables I/O bus interface 100 to deduce that device's ID, a READ instruction, a memory 22 address at which reading is to commence, and a count indicating how many sequential bytes of data are to be read from memory 22. It is illustratively assumed that bus 20 supports up to one word-wide data transfers. The count therefore indicates a byte, a half-word (2 bytes), or a full-word (4 bytes) transfer. It is also illustratively assumed that a single READ operation cannot cross a memory block 230 boundary: all bytes requested by device 29 lie within the same memory block 230.

Figure 5:
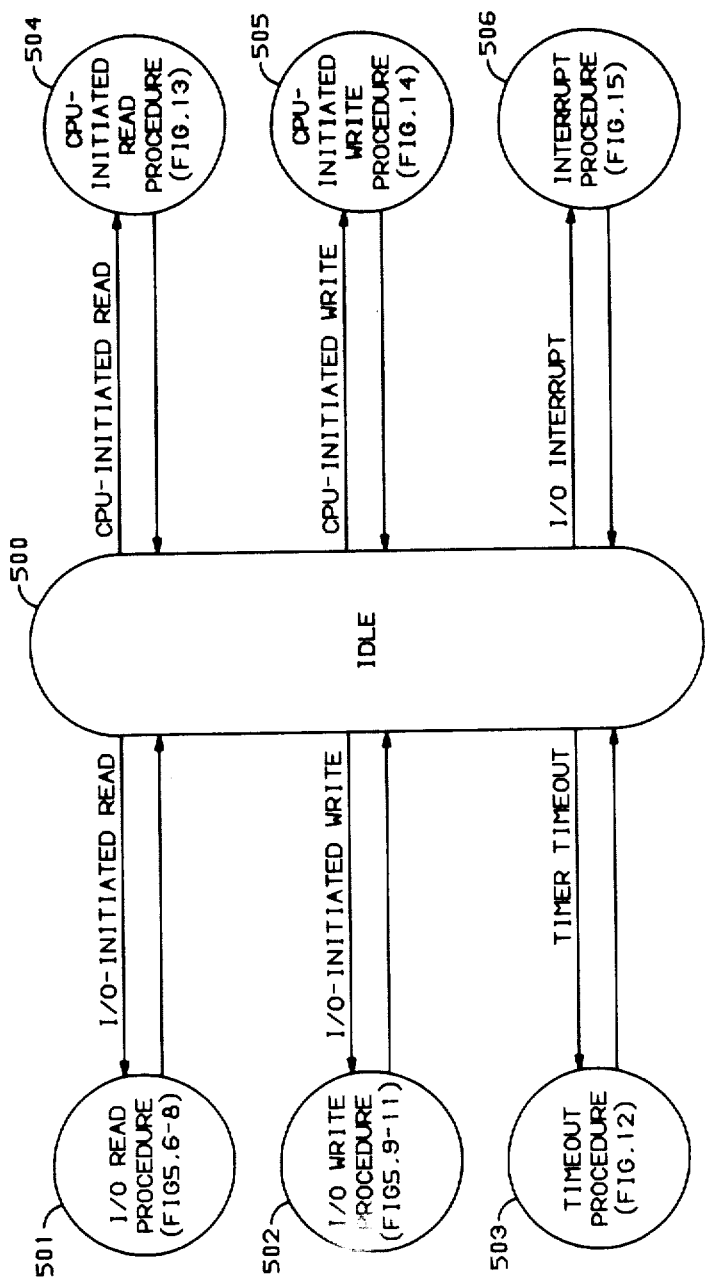
FIG. 5 is a state diagram of the operation of the sequencer of the I/O interface of FIG. 2.

Interface 100 receives the information output on bus 20 by device 29 and sends it to sequencer 125. Turning now to FIG. 5, sequencer 125 receives the information from interface 100 in idle state 500. Presence of the READ instruction causes sequencer 125 to enter "state" 501 and execute I/O READ procedure of FIGS. 6-8.

Figure 6:
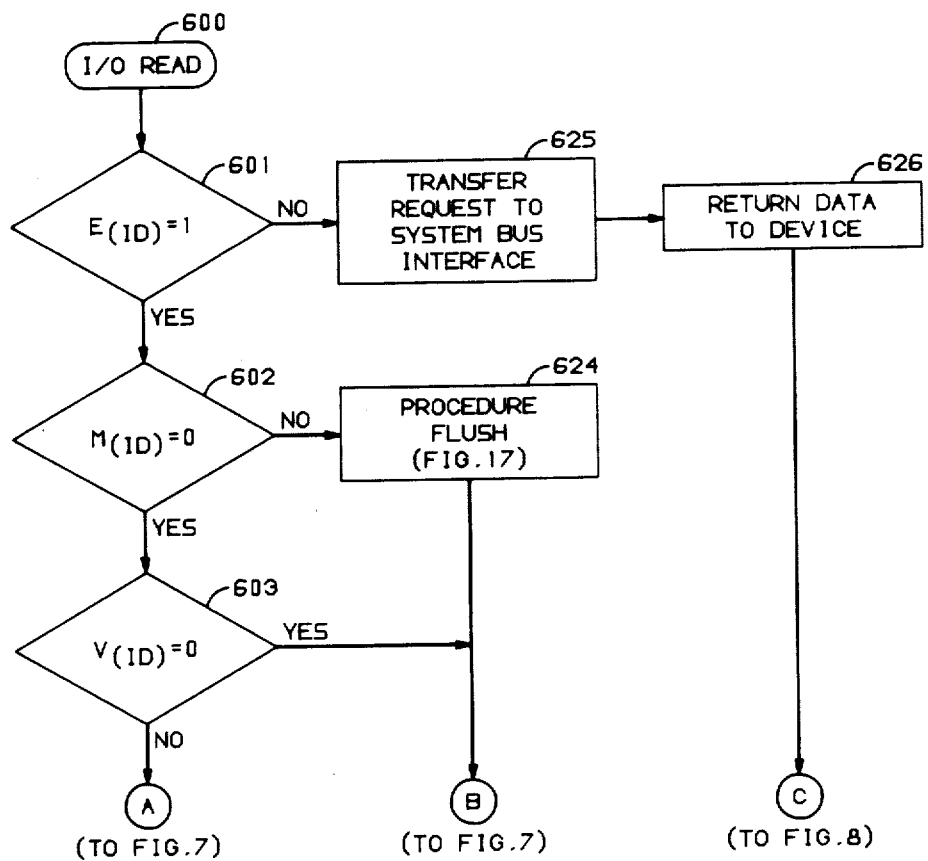
FIGS. 6–8 are a flow diagram of the procedure performed in I/O READ state of FIG. 5.

Turning now to FIG. 6, upon starting to execute I/O READ procedure at block 600, sequencer 125 first uses the received device ID to identify register 123 of that device 29, and uses test and set circuit 128 to determine values of V, M, and E fields 133-135 of that register 123, as indicated in blocks 601-603. If fields 133 and 134 have "zero" values and field 135 has a "one" value, it indicates that buffering of memory data transfers is enabled for this device 29 and that this device 29 is not currently using any buffer block 110. Sequencer 125 therefore checks if requested buffer block 110—the one pointed to by buffer block pointer 167 of the received address—is free for use by this device 29. It does so by accessing the requested buffer block's ID table word 121 and examining contents of that word 121 to determine if they are "null", as indicated in block 604. A "null" is a predetermined value that does not correspond to any device 29.

If they are not null, it indicates that requested buffer block 110 is being used (i.e., is "owned") by device 29 identified by those contents. Sequencer 125 then uses contents of the accessed word 121 to identify register 123 of owner device 29, and uses test and set circuit 128 to determine value of owner device's V and M fields 133 and 134, as suggested at block 605.

If M field 134 is cleared and V field 133 is set, it indicates that owner device 29 was reading requested buffer block 110. Sequencer 125 therefore frees requested buffer block 110 of information stored therein and of owner device 29 by executing an invalidate procedure, as suggested in block 606, to which it passes the ID of owner device 29.

Figure 16:
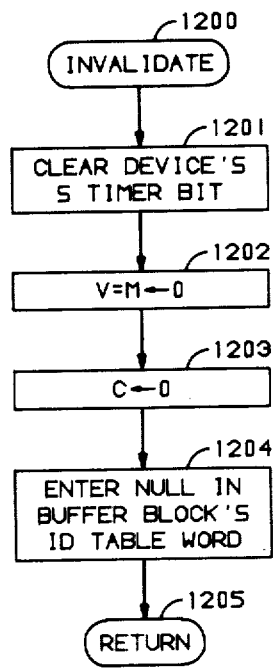
FIG. 16 is a flow diagram of the invalidate procedure of FIGS. 6–15.

The invalidate procedure is flowcharted in FIG. 16. Sequencer 125 enters the procedure, at block 1200, uses the ID that was passed to it to identify, access, and clear the identified device's S timer bit 151 in microprocessor 124, as suggested in block 1201. Using the same ID, sequencer 125 identifies and accesses the identified device's register 123, and uses test and set circuit 128 to clear the accessed register's V and M fields 133 and 134, as indicated at block 1202. Sequencer 125 also clears C field 132 of accessed register 123, as indicated at block 1203. Using buffer block pointer 167 of A field 131 of accessed register 123, sequencer 125 then accesses ID table word 121 of that buffer block 110 and enters therein a null value, as indicated at block 1204. Sequencer 125 then ends the procedure by returning to its previous activity, as indicated at block 1205.

Figure 7:
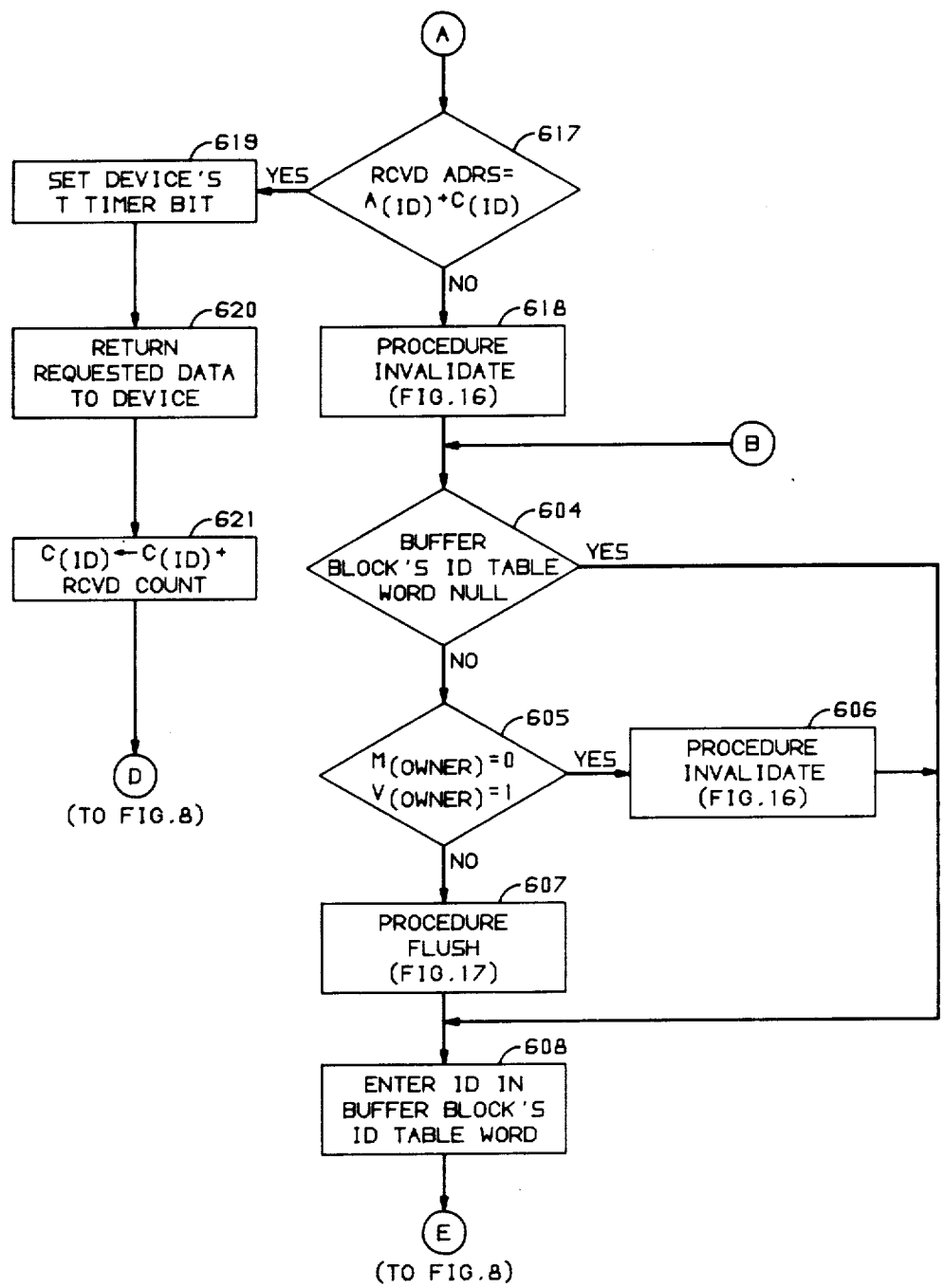

Returning block 605 of FIG. 7, if M field 134 of owner device 29 is set and V field 132 is cleared, it indicates that owner device 29 was writing requested buffer block 110. Sequencer 125 therefore frees requested buffer block 110 by executing a flush procedure, as suggested in block 607, to which it passes the ID of owner device 29.

Figure 17:
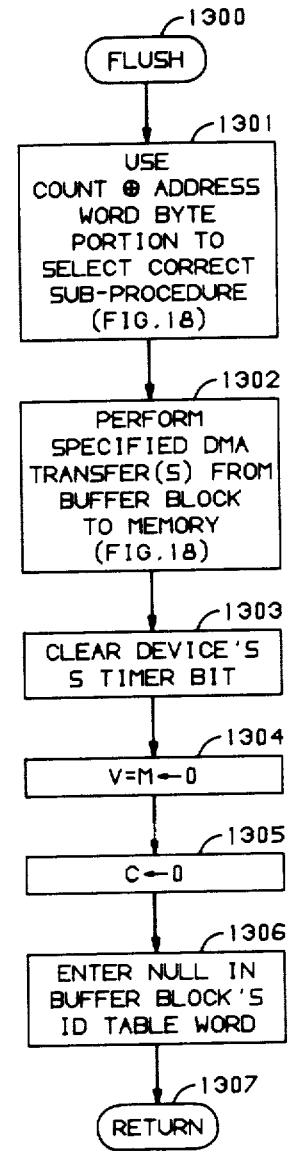
FIG. 17 is a flow diagram of the flush procedure of FIGS. 6–15.

The flush procedure is flowcharted in FIG. 17. Sequencer 125 enters the procedure, at block 1300, uses the device ID that was passed to it to identify and access the identified device's register 132, and uses C field 132 thereof and word byte pointer 164 of A field 131 thereof as a pointer to one of a number of sub-procedures, as suggested in block 1301. Each sub-procedure causes sequencer 125 to convey data stored in buffer block 110 to memory 22. Illustratively, FIG. 18 shows the 64-way call that selects the correct sub-procedure. Sequencer 125 uses C field 132 and word byte pointer 164 to select the correct sub-procedure, as indicated in block 1301. For operational speed considerations, it is preferable that the various possible sub-procedures and the selection thereof be encoded in combinatorial logic.

Turning to FIG. 18, it represents in tabular form the different steps that sequencer 125 must perform as a function of the different possible values of C field 132 and word byte pointer 164. The vertical axis represents the possible values of C field 132. The horizontal axis represents the possible values of word byte pointer 164. Each entry lying at an intersection of the axes indicates horizontally the sequence of memory operations that must be performed, for those values of C field 132 and word byte pointer 164. In the table, B represents a byte operation, H represents a half-word operation, W represents a full-word operation, and Q represents a quad-word operation. Below every operation there is indicated the offset from the contents of A field 131 of owner device 29 at which the corresponding operation is to be performed. For example, if count is 7 and word byte pointer 164 is "01", then a byte operation is performed at the address stored in owner device's A field 131, then a half-word operation is performed at an address that is the value of A field 131 incremented by 1, and then a full-word operation is performed at an address that is the value of A field 131 incremented by 3.

Returning to FIG. 17, having selected the appropriate sub-procedure at block 1301, sequencer 125 executes the specified operations by performing DMA transfers to memory 22 from buffer block 110 pointed to by buffer block pointer 167 of accessed register 123, as indicated in block 1302, thus conveying information from buffer block 110 to memory 22. Sequencer 125 also accesses and clears S timer bit 151 of owner device 29 in microprocessor 124, as suggested in block 1303. Sequencer 125 then accesses again register 123 of owner device 29 and uses test and set circuit 128 to clear accessed register's V and M fields 133 and 124, as indicated at block 1304. Sequencer 125 also clears C field 132 of accessed register 123, as indicated at block 1305. Using buffer block pointer 167 of A field 131 of accessed register 123, sequencer 125 then accesses ID table word 121 of that buffer block 110 and enters therein a null value, as indicated at block 1306. Sequencer 123 then ends the procedure by returning to its previous activity, as indicated at block 1307.

Returning to FIG. 7, after sequencer 115 has either freed requested buffer block 110 at blocks 606 or 607 or found it to be free at block 604, sequencer 125 enters the ID of device 29 that is requesting the memory READ operation into ID table word 121 of requested buffer block 110, as indicated in block 608. Sequencer 125 then accesses the device's register 123 and uses test and set circuit 128 to set V field 133, as indicated in block 609. Sequencer 125 stores the address and count received from requesting device 29 in A fields 131 and C field 132, respectively, of that device's register 123, as suggested in blocks 610 and 611, respectively. Sequencer 612 then requests use of bus 23 through interface 101 and performs a DMA quad-word transfer of memory block 230 that includes addressed memory word 220, from memory 22 to requested buffer block 110, as suggested in block 612. Interface 24 thus acts as a cache for devices 29, prefetching from memory data in addition to requested data in anticipation of locality of reference by the requesting device 29 in successively reading memory 22.

Having obtained a memory block 230 from memory 22 and stored it in requested buffer block 110, sequencer 125 also sets requesting device's corresponding timer bits 151 and 152 in microprocessor 124, as suggested in block 613. Sequencer 125 then uses contents of requesting device's A and C fields 131 and 132 to identify and retrieve from buffer block 110 the data requested by requesting device 29 and moves it to interface 100 for return to requesting device 29, as suggested by block 614. Interface 100 conveys the data to requesting device 29 over bus 20 according to the protocol of bus 20.

Sequencer 125 then checks whether contents of the last word 210 of requested buffer block 110 has been sent to requesting device 29, as suggested in block 622. It does this, for example, by adding contents of C field 132 to block byte pointer 162 of A field 131 to see if the four least significant bits of the result are zero. If so, all conveyable data stored in buffer block 110 has been conveyed to requesting device 29, and sequencer 125 performs the invalidate procedure of FIG. 16, as suggested in block 623. After it has performed the procedure in block 623, or if it finds at block 622 that the last buffer entry has not been returned, sequencer 125 has completed its task, and it returns at block 627 to idle state 500 of FIG. 5.

Returning to block 603 of FIG. 6, if sequencer 125 finds V field 133 of register 123 of requesting device 29 set, it means that requesting device 29 has recently performed a memory READ operation, and that the current READ operation is a successive, i.e., not the first in a sequence, READ operation of requesting device 29. Sequencer 125 therefore checks, at block 617, whether requesting device 29 is now reading from same memory block 230 as before, and whether it is reading an item of data contiguous in block 230 with the previously read data, i.e., whether the successive READ access is sequential. Sequencer 125 does so by adding contents of A field 131 and C field 132 of requesting device's register 123 and comparing the result with the address just received from requesting device 29, as indicated in block 617. If there is no match, the access is not sequential, and sequencer 125 performs the invalidate procedure of FIG. 16, as indicated at block 618, to free buffer block 110 currently assigned for use by requesting device 29. Thereafter, sequencer 125 continues operation at block 604 in the manner described previously.

If the check at block 617 indicates that access is sequential to the same memory block 230 as before, sequencer 125 sets T time bit 152 of requesting device 29 in microprocessor 124, as indicated at block 619, to indicate to microprocessor 124 that buffer block 110 assigned for use by requesting device 29 has been accessed. Sequencer 125 then returns requested data from that buffer block 110 to requesting device 29, as indicated at block 620, in the manner described for block 614. Sequencer 125 uses incrementer 127 to increment contents of C field 132 of requesting device 29 by the count received from requesting device 29 as part of the current read operation, as suggested in block 621. Sequencer 125 then continues operation at block 622, in the manner described above.

Returning to block 602, if sequencer 125 finds M field 134 of register 123 of requesting device 29 set, it means that requesting device 29 has recently performed a memory WRITE operation whose results are still being held in a buffer block 110. Sequencer 125 therefore performs the flush procedure of FIG. 17, as indicated in block 624, to transfer the written data from buffer block 110 to memory 22 and to free that buffer block 110 from requesting device 29. Thereafter, sequencer 125 continues operation at block 604, in the manner described previously.

Returning to block 601, if sequencer 125 finds E field 135 of requesting device 29 to be cleared, it indicates that I/O operations for requesting device 29 are not to be buffered by interface 24. Sequencer 125 therefore merely transfers all the information that it received from interface 100 to interface 101, as indicated in block 625.

Interface 101 responds by performing the requested memory READ operation over bus 23 on behalf of requesting device 29, according to the protocol of bus 23. Only the requested data are fetched from memory 22. There is no data block 230 prefetch as on a read request that is buffered by interface 24. When interface 101 receives the requested data over bus 23, it sends it to sequencer 125, which merely transfers the data to interface 100 for return to requesting device 29, as suggested at block 626. The task of sequencer 125 is thereby completed, and it returns at block 627 to idle state 500 of FIG. 5.

Figure 8:
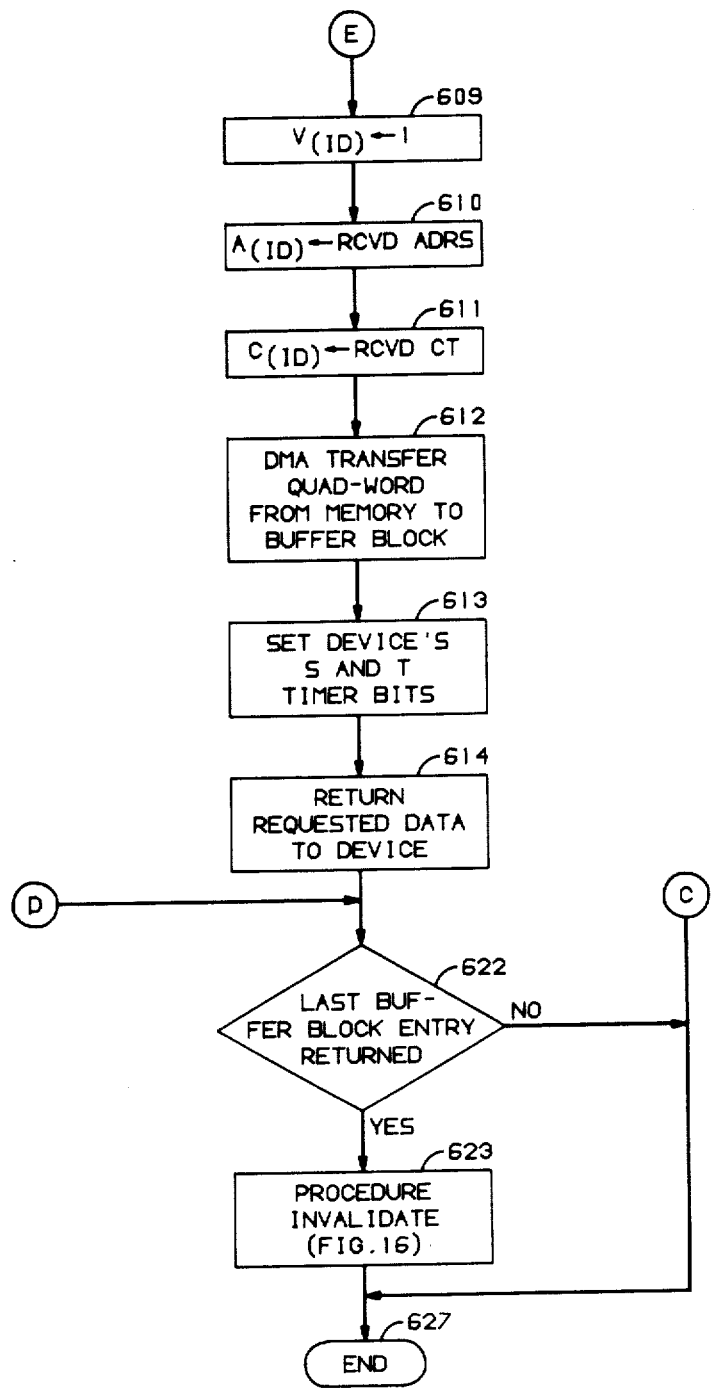

The activity followed in the case of a device 29 writing memory 22 closely parallels that of reading memory 22 described in conjunction with FIGS. 6-8. Requesting device 29 obtains use of bus 20, generates thereon information that enables I/O bus interface 100 to deduce that device's ID, the memory address at which writing is to commence, accompanied by the data item that is to be written, and a count of the number of bytes of data in the data item. It is illustratively assumed that a single WRITE operation cannot cross a memory block 230 boundary.

The information generated by device 29 is received by interface 100 and is transferred to sequencer 125. Sequencer 125 receives the information from interface 100 in idle state 500 of FIG. 5. Presence of the WRITE instruction causes sequencer 125 to enter "state" 502 and execute I/O WRITE procedure of FIGS. 9-11.

Figure 9:
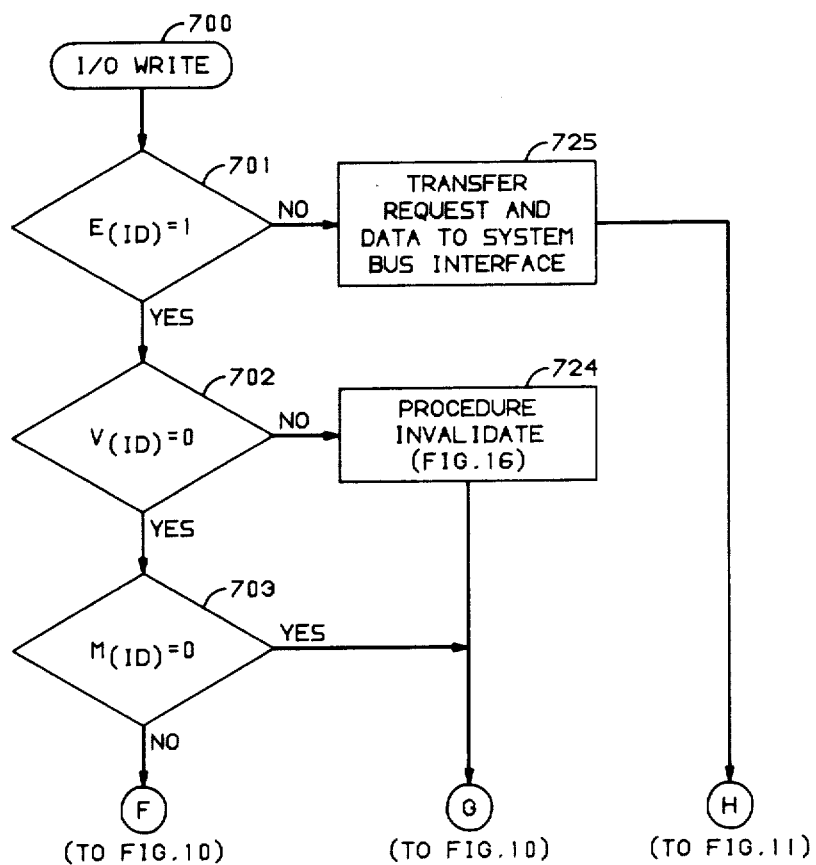
FIGS. 9–11 are a flow diagram of the procedure performed in I/O WRITE state of FIG. 5.
Figure 10:
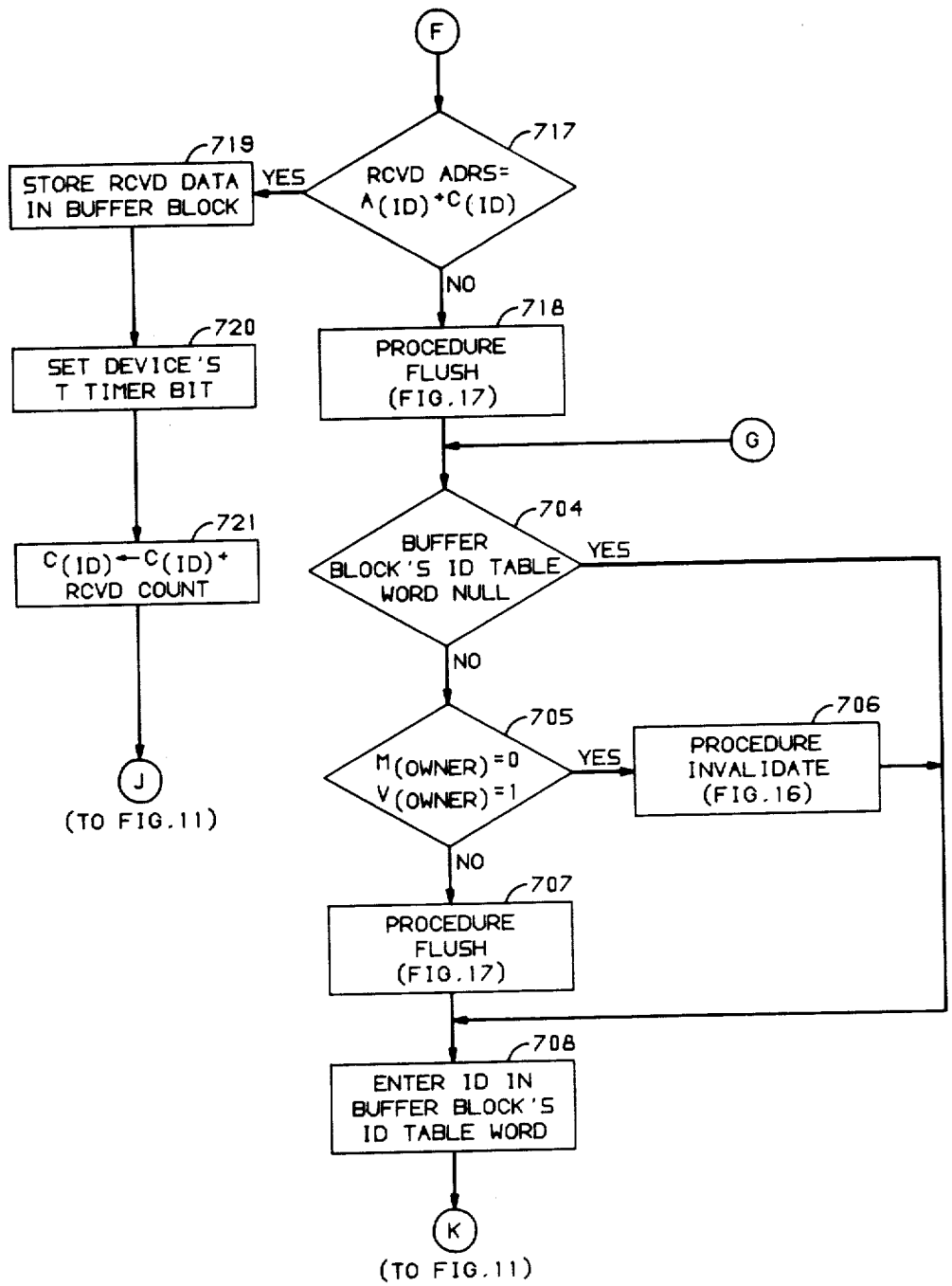
Figure 11:
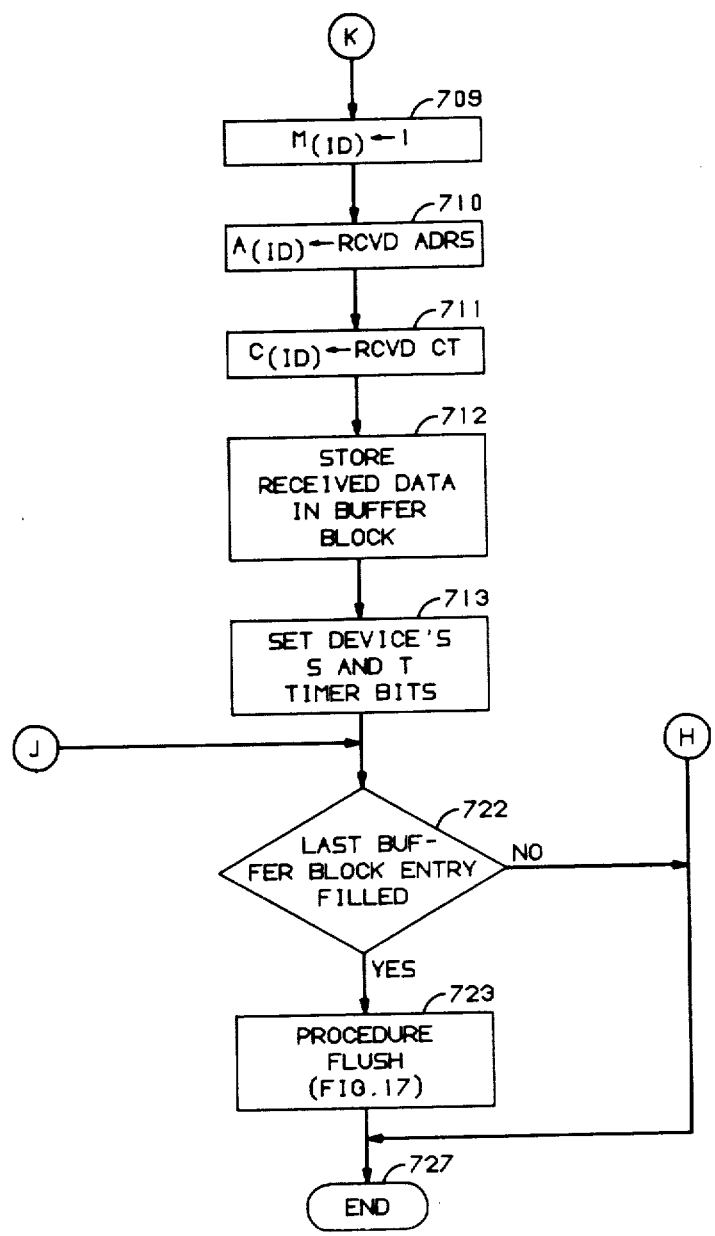

Turning to FIG. 9, upon entering I/O WRITE procedure at block 700, sequencer 125 first checks the value of V, M, and E fields 133-135 of register 123 of requesting device 29, at blocks 701-703. If E field 135 is set and V and M fields 133 and 134 are cleared, it indicates that buffering of data transfers is being done for requesting device 29 and that device 29 is currently not using any buffer 110. Sequencer 125 therefore checks at block 704 if requested buffer block 110 is free, and if it is not, sequencer 125 frees it at blocks 705-707, all in the manner described for blocks 604-607.

When requested block 110 is free, sequencer 125 stores the ID of requesting device 29 in ID table word 121 of requested block 110, at block 708, in the manner described for block 608. Sequencer 125 then uses test and set circuit 128 to set M field 134 of requesting device 29, at block 709, and stores the address and the count received from requesting device 29 in that device's A and C fields 131 and 132, respectively, at blocks 710 and 711, respectively. Using buffer block address 168, sequencer 125 stores data received from requesting device 29 in requested buffer block 110, as indicated at block 712. Sequencer 125 also sets S and T timer bits 151 and 152 of requesting device 29 in microprocessor 124, as suggested in block 713. Sequencer 125 then checks whether the last entry—last byte—of requested buffer block 110 has been written with data from requesting device 29. It performs the check in the same manner as the check at block 622. If the last entry of buffer block 110 has been filled, the requested buffer block 110 has run out of storage space available to store further information receivable from requesting device 29. Sequencer 125 therefore executes the flush procedure of FIG. 17, as indicated in block 723. The task of sequencer 125 is thereby completed, and it ends its operation and returns to idle state 500 of FIG. 5, as indicated at block 727.

Returning to block 703, if sequencer 125 finds M field 134 of register 123 of requesting device set, it means that requesting device 29 has recently performed a memory WRITE operation, and that the current WRITE operation is a successive WRITE operation of requesting device 29. Sequencer 125 therefore checks, at block 717, whether the current WRITE access is sequential with the previous write. Sequencer 125 does so in the manner described for block 617. If the access is not sequential, sequencer 125 performs the flush procedure of FIG. 17, as indicated at block 718, to free buffer block 110 currently assigned for use by requesting device 29. Thereafter, sequencer 125 continues operation at block 704.

If the check at block 717 indicates that access is sequential and to the same memory block 230 as before, sequencer 125 stores the data successively received from requesting device 29 in requested buffer block 110, as indicated at block 719, in the manner described for block 712. Buffer block 110 thus contains a plurality of data items successively received from the requesting device 29. Sequencer 125 also sets T timer bit 152 of requesting device 29 in microprocessor 124, as indicated at block 720, and increments contents of C field 132 of requesting device 29 by the count received from requesting device 29 as part of the current WRITE request, as suggested in block 721. Sequencer 125 then continues operation at block 722, in the manner described previously.

Returning to block 702, if sequencer 125 finds V field 133 of register 123 of requesting device 29 set, it means that requesting device 29 has recently performed a memory READ operation whose results are still being held in a buffer block 110. Sequencer 125 therefore performs the invalidate procedure of FIG. 16, as indicated in block 724, to free that buffer block 110 from requesting device 29. Thereafter, sequencer 125 continues operation at block 704.

Returning to block 701, if sequencer 125 finds E field 135 of requesting device 29 to be cleared, it indicates that I/O operations for requesting device 29 are not buffered by interface 24. Sequencer 125 therefore merely transfers all the information that it received from interface 100 to interface 101, as indicated in block 125. Interface 101 responds by performing the requested memory WRITE operation over bus 23 on behalf of requesting device 29, according to the protocol of bus 23. The task of sequencer 125 is completed, and it returns at block 727 to idle state 500 of FIG. 5.

Figure 12:
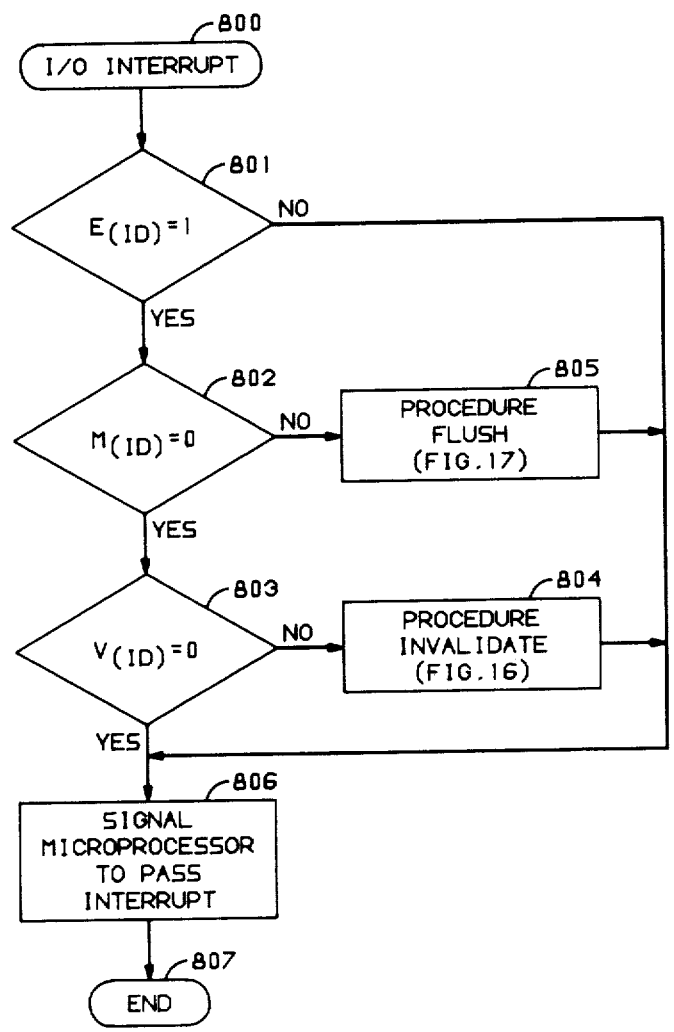
FIG. 12 is a flow diagram of the procedure performed in I/O INTERRUPT state of FIG. 5.

Receipt by idle sequencer 125 of a signal from microprocessor 124 informing it that a device 29 has issued a CPU 21 interrupt sends sequencer 125 from idle state 500 of FIG. 5 to "state" 503 wherein it executes I/O INTERRUPT procedure of FIG. 12. Turning to FIG.

12, upon entering the procedure at block 800, sequencer 125 first checks the value of V, M, and E fields 133–135 of register 123 of device 29 issuing the interrupt, at blocks 801–803. If E field 135 is set and V and M fields 133 and 134 are cleared, sequencer 125 illustratively signals microprocessor 124 to pass the interrupt to CPU 21, as indicated at block 806, and returns to idle state 500 of FIG. 5 at block 807. The same is true if E field 135 is cleared. If M and E fields 134 and 135 are set, sequencer 125 performs the flush procedure of FIG. 17, at block 805, and then continues operation at block 806. If V and E fields 133 and 135 are set, sequencer 125 performs the invalidate procedure of FIG. 16, at block 804, and then continues operation at block 806.

Figure 15:
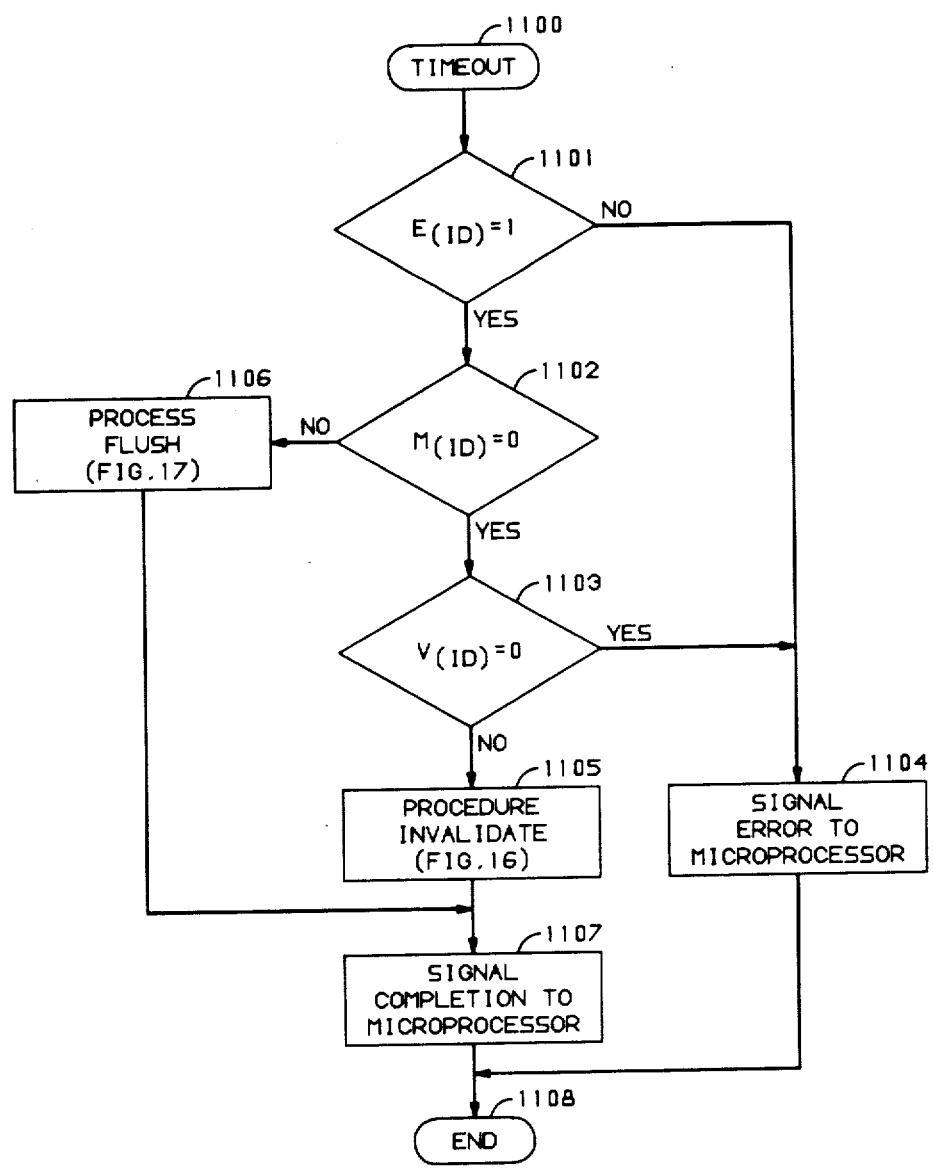
FIG. 15 is a flow diagram of the procedure performed in TIMEOUT state of FIG. 5.

Receipt by idle sequencer 125 of a timer timeout signal from microprocessor 124, informing it that device 29 has not accessed—has not stored data in or conveyed data out of—its "associated" (by means of ID table entry) buffer block 110 within a predetermined period, sends sequencer 125 from idle state 500 of FIG. 5 to "state" 506 wherein it executes TIMEOUT procedure of FIG. 15. Turning to FIG. 1, upon entering the procedure at block 1100, sequencer 125 first checks the value of V, M, and E fields 133–135 of register 123 of device 29 whose timer 150 timed out, at blocks 1101-1103. If E field 135 is set and V and M fields 133 and 134 are cleared, that device 29 should not be using a buffer block 110 and hence should not have associated timer 150 enabled. Therefore sequencer 125 signals error to microprocessor 124, at block 1104, and returns to idle state 500 of FIG. 5 at block 110. The same is true if E field 135 is cleared.

If M and E fields 134 and 135 are set, sequencer 125 performs the flush procedure of FIG. 17, at block 1106. Then it signals completion thereof to microprocessor 124, at block 1107, and returns to idle state 500 of FIG. 5, at block 1108. If V and E fields 133 and 135 are set, sequencer 125 performs the invalidate procedure of FIG. 16, at block 1105, and then continues operation at block 1107.

When CPU 21 generates on bus 23 a READ transaction accompanied by an I/O address as the source of data to be moved and a count indicating the number of bytes to be moved, interface 101 receives the information from bus 23 and passes it to sequencer 125.

Figure 13:
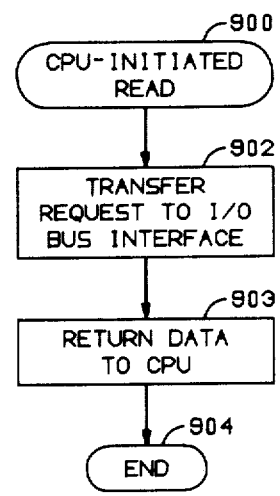
FIG. 13 is a flow diagram of the procedure performed in CPU-initiated READ state of FIG. 5.

Sequencer 125 receives the information from interface 101 in idle state 500 of FIG. 5, and in response enters "state" 505 to execute the CPU-initiated READ procedure of FIG. 13. Turning to FIG. 13, upon entering the READ procedure at block 900, sequencer 125 transfers the received information to interface 100, at block 902.

Interface 100 responds to the transfer by reading the requested data from the addressed device 29 and passing the data to sequencer 125. Sequencer 125 then returns the data to CPU 21, at block 903, by transferring the data to interface 101 and causing it to supply it to CPU 21 over bus 23. Sequencer then returns to idle state 500 of FIG. 5, at block 904.

When CPU 21 generates on bus 23 a WRITE transaction accompanied by an I/O address as the destination of data to be moved, a count indicating the number of bytes to be moved, and the data itself, interface 101 receives the information from bus 23 and passes the received information to sequencer 125.

Figure 14:
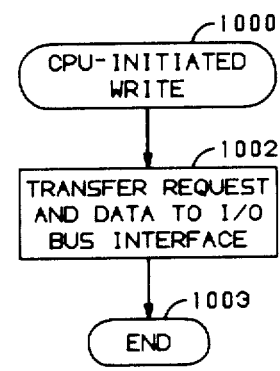
FIG. 14 is a flow diagram of the procedure performed in CPU-initiated WRITE state of FIG. 5.

Sequencer 125 receives the information from interface 101 in idle state 500 of FIG. 5, and in response enters "state" 504 to execute the CPU-initiated WRITE procedure of FIG. 14. Turning to FIG. 14, upon entering the WRITE procedure at block 1000, sequencer 125 transfers the received information to interface 100, at block 1002. Sequencer 125 then returns to idle state 500 of FIG. 5, at block 1003. Interface 100 responds to the transfer by writing the received data to addressed device 29.

Of course, various changes and modifications to the illustrative embodiment of the invention described above will be apparent to those skilled in the art. For example, decision sequences shown in the flowcharts need not be performed serially but may be performed in parallel via combinatorial logic. Such changes and modifications can be made without departing from the spirit and the scope of the invention and without diminishing its attendant advantages. It is therefore intended that such changes and modifications be covered by the following claims.

What is claimed is:

1. A processing system comprising:
a plurality of input and output devices;
a memory having a plurality of non-overlapping portions, each portion being contiguous and for storing information; and
an input and output interface connecting the plurality of devices to the memory, the interface including a plurality of buffers, each buffer fixedly mapped to at least one memory portion, the at least one memory portion which is mapped to a buffer being different from memory portions that are mapped to the other buffers, each buffer having a storage size smaller than the size of any memory portion mapped to the buffer, and each buffer for temporarily storing information being transferred between the devices and the at least one memory portion which is mapped to the buffer, the input and output interface including
a control arrangement coupled to the buffers, the control arrangement including
first means responsive to information received from a device seeking access to a destination memory portion, for storing the received information in the buffer mapped to the destination memory portion,
second means cooperative with the first means, for transferring the stored information to the destination memory portion,
third means responsive to a request for information received from a device seeking access to a source memory portion, for obtaining information requested by the requesting device from the source memory portion,
fourth means cooperative with the third means, for storing the requested information in the buffer mapped to the source memory portion, and
fifth means cooperative with the third means, for transferring the requested information to the requesting device.

2. The system of claim 1 wherein each memory portion has a storage size that is an integral multiple of the storage of the buffer which is mapped to the memory portion.

3. The system of claim 1 wherein each buffer is mapped to a plurality of mutually non-contiguous memory portions, the memory portions that are mapped to a buffer being different from memory portions that are mapped to the other buffers, and each of the plurality of memory portions that are mapped to a buffer having a storage size larger that the storage size of the buffer to which the plurality of memory portions are mapped.

4. The system of claim 3 wherein each memory portion has a storage size that is an integral multiple of the storage size of the buffer to which the memory portion is mapped.

5. The system of claim 1 wherein the memory comprises a plurality of memory locations each having a different address, and each memory portion includes a plurality of memory locations having sequential memory addresses, and wherein each buffer is for temporarily storing information accompanied by a memory address of a location included in the at least one memory portion which is mapped to the buffer.

6. The system of claim 1 wherein the first means store in a buffer information received from one device seeking access to the destination memory portion which is mapped to the buffer, until occurrence of any one of (a) receipt of information from another device of information seeking access to a memory portion which is mapped to the buffer, (b) receipt from a device of a request for information from a device seeking access to a memory portion which is mapped to the buffer, and (c) the buffer running out of storage space for further information receivable from the one device seeking access to the destination memory portion, and wherein the control second means are responsive to occurrence of any of (a), (b), and (c) for effecting transfer of information stored in the buffer to the destination memory portion.

7. The system of claim 6 wherein the first means store in the buffer information received from the one device seeking access to the destination memory portion, until occurrence of any one of (a), (b), (c), and (d) elapsing of a predetermined period of time from when information was last stored in the buffer, and wherein the second means are responsive to occurrence of any of (a), (b), (c), and (d) for effecting transfer of information stored in the buffer to the destination portion.

8. The system of claim 7 wherein the first means store in the buffer information received from the one device seeking access to the destination memory portion, until occurrence of any one of (a), (b), (c), (d), and (e) receipt of information from the one device now seeking access to another memory portion, and wherein the second means are responsive to occurrence of any of (a), (b), (c), (d), and (e) for effecting transfer of information stored in the buffer to the destination memory portion.

9. The system of claim 8 wherein the first means store in the buffer received from the one device seeking access to the destination memory portion, until occurrence of any of e of (a), (b), (c), (d), (e), and (f) receipt from the one device that was seeking access to the destination memory portion, of information which is to be stored in the memory non-contiguously with information last stored in the buffer, and wherein the second means are responsive to occurrence of any of (a), (b), (c), (d), (e), and (f) for effecting transfer of information stored in the buffer to the destination memory portion.

10. The system of claim 1 wherein the fifth means transfer to one device seeking access to the source memory portion information requested by the one device and stored in a buffer mapped to the source memory portion, until occurrence of any one of (a) receipt of a request for information from another device seeking access to a memory portion mapped to the buffer, (b) receipt of information from a device seeking access to a memory portion mapped to the buffer, and (c) all transferable information stored in the buffer having been transferred to the one device, and the control arrangement further comprises sixth means responsive to occurrence of any of (a), (b), and (c) for freeing the buffer of stored information.

11. The system of claim 10 wherein the fifth means transfer to the one device information requested by the one device stored in the buffer, until occurrence of any one of (a), (b), (c), and (d) elapsing of a predetermined period of time from when information was last transferred from the buffer, and the sixth means are responsive to occurrence of any of (a), (b), (c), and (d) for freeing the buffer of stored information.

12. The system of claim 11 wherein the fifth means transfer to the one device information requested by the one device and stored in the buffer, until occurrence of any one of (a), (b), (c), (d), and (e) receipt of a request for information from the one device now seeking access to another memory portion, and the sixth means are responsive to occurrence of any of (a), (b), (c), and (d) for freeing the buffer of stored information.

13. The system of claim 12 wherein the fifth means transfer to the one device information requested by the one device and stored in the buffer, until occurrence of any one of (a), (b), (c), (d), (e), and (f) receipt from the o device that was seeking access to the source memory portion, of a request for information which is stored in the memory non-contiguously with information last transferred from the buffer to the one device, and the sixth means are responsive to occurrence of any of (a), (b), (c), (d), (e), and (f) for freeing the buffer of stored information.

14. A processing system comprising:

a plurality of input and output devices;

a memory having a plurality of non-overlapping portions, each portion being contiguous and for storing information; and an input and output interface unit connecting the plurality of devices to the memory, the interface unit including:

a plurality of buffers, each buffer fixedly mapped to at least one memory portion, the at least one memory portion which is mapped to a buffer being different from memory portions that are mapped to the other buffers, each buffer having a storage size smaller that the size of any memory portion mapped to the one buffer, and each buffer for temporarily storing information being transferred between the devices and the at least one memory portion which is mapped to the buffer, and a control means arrangement coupled to the buffers, the control arrangement including:

The system of claim 1 wherein the first means are responsive to a plurality of items of information successively received from a device seeking access to a destination memory portion, for successively storing the received items of information in the buffer mapped to the destination memory portion, the second means are for transferring the stored plurality of items from the buffer to the destination memory portion, the third means are responsive to a request for an item of information received from a device seeking access to a source memory portion, for obtain from the source memory portion a plurality of items of information including an item requested by the requesting device, the fourth means are for storing the plurality of items of information obtained from the source memory portion in the buffer mapped to the source memory portion, and the fifth means are for transferring the requested item to the requesting device, the fifth means further are responsive to a successive request received from a device for an item of information stored in the buffer, for transferring the requested item from the buffer to the requesting device.

15. The system of claim 1 wherein the memory comprises a plurality of words; wherein each memory portion is a memory page comprising a plurality of blocks of words; and wherein each buffer has a storage size of a block of words.

16. A processing system comprising:

a plurality of input and output devices;

a memory having a plurality of pages, each page comprising a plurality of blocks of words of memory, the words of each page and of each block having addresses which are contiguous in an address spectrum of the memory, each word serving to store at least one item of data; and an input and output interface unit connecting the plurality of devices with the memory and including a plurality of buffers, each buffer comprising a block of storage words and each buffer fixedly mapped to a different at least one page of memory, a buffer serving to temporarily store data items being transferred between the devices and the at least one page which mapped to the buffer, and a control arrangement coupled to the plurality of buffers, the control arrangement including first means responsive to a plurality of data items successively received from a device seeking access t a destination memory page, for successively storing the received data items the buffer which is mapped to the destination page, until occurrence of a fi condition, second means responsive to the occurrence of the first condition for effecting transfer of the plurality of stored data items from the buffer to the memory, third means responsive to a request for a data item received from a device seeking access to a source memory page, for obtaining from the memory a block of data items including an item requested by the requesting device, fourth means for transferring the requested item to the requesting device, fifth means for storing the obtained block, of data in the buffer which is mapped to the source page, until occurrence of a second condition, and sixth means responsive to a successive request received from the device prior to the occurrence of the second condition for a data item included in the block stored in the buffer which is mapped to the source page, for retrieving the requested item from the buffer and transferring the requested item to the device.

17. The system of claim 16 wherein the first condition is any one of (a) receipt of a data item from another device seeking access to a page mapped to the buffer, (b) receipt of a request for a data item from a device seeking access to a page mapped to the buffer, (c) the buffer running out of storage words for further data items receivable from the device, (d) elapsing of a predetermined period of time from when a data item was last stored in the buffer, (e) receipt of a data item from the device now seeking access to a page not mapped to the buffer, and receipt of a data item from the device, (f) which is to be stored in words of a page non-contiguously with a data item last stored in the buffer.

18. The system of claim 16 wherein the second condition is any one of (a) receipt of a request for a data item from another device seeking access to a page mapped to the buffer, (b) receipt of a data item from a device seeking access to a page mapped to the buffer, (c) all transferable data items stored in the buffer having been transferred to the device, (d) elapsing of a predetermined period of time from when a data item was last transferred from the buffer, (e) receipt of a request for a data item from the device now seeking access to a page not mapped to the buffer, and (f) receipt of a request from the device, for a data item stored in words of a page non-contiguously with a data item last transferred to the device.

19. An input and output interface unit for connecting a plurality of input and output devices to a communication medium, comprising:

a first port for connecting to the plurality of devices;

a second port for connecting to the medium;

a plurality of buffer coupled to the first and the second port, each buffer fixedly mapped to a different at least one contiguous portion of an address spectrum including a plurality of addresses, each buffer having a storage size smaller than the storage size of storage addressed by any spectrum portion mapped to the buffer, and each buffer for temporarily storing information being transferred between the first and the second port and identified by addresses included in a spectrum portion mapped to the buffer; and a control arrangement coupled to the buffers, the control arrangement including first means responsive to information received from a device giving an address included in a destination spectrum portion, for storing the received information in the buffer which is mapped to the destination spectrum portion second means cooperative with the first means, for transferring the stored information to the medium, third means responsive to a request for information received from a device giving an address included in a source spectrum portion, for obtaining information requested by the requesting device from the medium, fourth means cooperative with the third means, for storing the requested information in the buffer which is mapped to the source spectrum portion, and fifth means cooperative with the third means, for transferring the requested information to the requesting device.

20. The interface of claim 19 wherein each spectrum portion addresses storage having a storage size that is an integral multiple of the storage size of the buffer which is mapped to the spectrum portion.

21. The interface of claim 19 wherein each buffer is mapped to a plurality of mutually non-continuous spectrum portions that are different from spectrum portions that are mapped to other buffers, and e of the plurality of spectrum portions addresses storage having a storage size larger than the storage size of the buffer which is mapped to the spectrum portion.

22. The interface of claim 21 wherein each one spectrum portion addresses storage having a storage size that is an integral multiple of the storage size of the buffer which is mapped to the at least o spectrum portion.

23. The interface of claim 19 wherein the control first means store in a buffer information received from one device and giving an address included in the destination spectrum portion, until occurrence of any one of (a) receipt of information from another device giving an address included in a spectrum portion which is mapped to the buffer, (b) receipt of a request for information from a device giving an address included in a spectrum portion which is mapped to the buffer, and (c) the buffer running out of storage space for further information receivable from the one device giving an address included in the destination spectrum portion, and wherein the second means are responsive to occurrence of any of (a), (b), and (c) for effecting transfer of information stored in the buffer to t medium.

24. The interface of claim 23 wherein the first means store in the buffer information received from the one device giving an address included in the destination spectrum portion, until occurrence of any one of (a), (b), (c), a (d) elapsing of a predetermined period of time from when information was last stored in the buffer, and wherein the second means are responsive to occurrence of any of (a), (b), (c), and (d) for effecting transfer of information stored in the buffer to the medium.

25. The interface of claim 24 wherein the first means store in the buffer information received from the one device giving an address included in the destination spectrum portion, until occurrence of any one of (a), (b), (c), (d), and (e) receipt of information from the one device now giving an address included in another spectrum portion, and wherein the second means are responsive to occurrence of any of (a), (b), (c), (d), and (e) for effecting transfer of information stored in the buffer to the medium.

26. The interface of claim 25 wherein the first means store in the buffer information received from the one device giving an address included in the destination spectrum portion, until occurrence of any one of (a), (b), (c), (d), (e), and (f) receipt of information from the one device giving an address which is non-contiguous with addresses of information that was last stored in the buffer, and wherein the second means are responsive to occurrence of any of (a), (b), (c), (d), (e), and (f) for effecting transfer of information stored in the buffer to the medium.

27. The interface of claim 19 wherein the fifth means transfer to one device giving an address included in the source spectrum portion information requested by the one device and stored in the buffer which is mapped to the source spectrum portion, until occurrence of any one of (a) receipt of a request for information from another device giving an address included in the source spectrum portion, (b) receipt of information from a device giving an address included in a spectrum portion which is mapped to the buffer, and (c) all transferable information stored in the buffer having been transferred to the one device, and wherein the control arrangement further comprises sixth means responsive to occurrence of any of (a), (b), and (c) for freeing the buffer of stored information.

28. The interface of claim 27 wherein the fifth means transfer to the one device information requested by the one device and stored in the buffer, until occurrence of any one of (a), (b), (c), and (d) elapsing of a predetermined period of time from when information was last transferred from the buffer, and the sixth means are responsive to occurrence of any of (a), (b), (c), and (d) for freeing the buffer of stored information.

29. The interface of claim 28 wherein the fifth means transfer to the one device information requested by the one device and stored in the buffer, until occurrence of any one of (a), (b), (c), (d), and (e) receipt of a request for information from the one device now giving an address included in another spectrum portion, and the sixth means are responsive to occurrence of any of (a), (b), (c), and (d) for freeing the buffer of stored information.

30. The interface of claim 29 wherein the fifth means transfer information requested by the one device and stored in the buffer to the one device until occurrence of any one of (a), (b), (c), (d), (e) and (f) receive of a request for information from the one device giving an address non-contiguous with an address of information last conveyed from the buffer to the one device, and the sixth means are responsive to occurrence of any of (a), (b), (c), (d), (e), and (f) for freeing the buffer of stored information.

31. The interface of claim 19 wherein the first means are responsive to a plurality of items of information successively received from a device giving addresses included in a destination spectrum potion, for successively storing the received items of information in the buffer which is mapped to the destination spectrum portion, the second means are for transferring the stored plurality of items from the buffer to the medium, the third means are responsive to a request for an item of information received from a device giving an address included in a source spectrum portion for obtaining from the medium a plurality of items of information including item requested by the requesting device, the fourth means are for storing the plurality of items of information obtained from the medium in the buffer which is mapped to the source spectrum portion, and the fifth means are for transferring the requested item to the requesting device, the fifth means further are responsive to a successive request received from a device for an item of information stored in the buffer, for transferring the requested item from t buffer to the requesting device.

32. The interface of claim 19 wherein each spectrum portion addresses a page of memory comprising a plurality of blocks of memory words, the words of each page having address contiguous in the address spectrum; and wherein each buffer has a storage size of a block of words.

33. An input and output interface unit for connecting a plurality of input and output devices to a communication medium comprising:

a first port for connecting to the plurality of devices;

a second port for connecting to the medium;

a plurality of buffers, each buffer fixedly mapped to a different at least one contiguous portion of a memory address spectrum including a plurality of memory addresses, each spectrum portion addressing page of memory comprising a plurality of blocks of memory words, the words o each page and of each block having addresses that are contiguous in the address spectrum, each buffer comprising a block of storage words for temporarily storing data items being transferred between the first and the second port, the data items identified by addresses included in the at least one spectrum portion which is mapped to the one buffer, and a control arrangement coupled to the plurality of buffers, the control arrangement including first means responsive to a plurality of data items successively received from a device giving an address included in a destination spectrum portion, for successively storing the received data items in the buffer which is mapped to the destination spectrum portion, until occurrence of a first condition, second means responsive to the occurrence of the first condition for effecting transfer of the plurality of stored data items from the buffer to the medium, third means responsive to a request for a data item received from a device giving an address included in a source spectrum portion, for obtaining from the medium a block of data items including an item requested by the requesting device, fourth means for transferring the requested item to the requesting device, fifth means for storing the obtained block of data in the buffer which is mapped to the source spectrum portion until occurrence of a second condition, and sixth means responsive to a successive request received from the device prior to the occurrence of the second condition for a data item included in the block which is stored in the buffer, for retrieving the requested item from the buffer and transferring the requested item to the device.

34. The interface of claim 33 wherein the first condition is any one of (a) receipt of a data item from another device giving an address included in a spectrum portion which is mapped to the buffer.

(b) receipt of a request for a data item from a device giving an address included in a spectrum portion which is mapped to the buffer.

(c) the buffer running out of storage words for further data items receivable from the device, (d) elapsing of a predetermined period of time from when a data item was last stored in the buffer, (e) receipt of a data item from the device now giving an address not included in the spectrum portion which is mapped to the buffer, and (f) receipt of a data item from the device giving an address which is non-contiguous with an address of a data item last stored in the buffer.

35. The interface of claim 33 wherein the second condition is any one of (a) receipt of a request for a data item from another device giving an address included in a spectrum portion which is mapped to the buffer, (b) receipt of a data item from a device giving an address included in a spectrum portion which is mapped to t buffer, (c) all transferable data items stored in the buffer having been transferred to the device, (d) elapsing of a predetermined period of time from when a data item was last transferred from the buffer, (e) receipt of a request for a data item from the device now giving an address include in a spectrum portion which is not mapped to the buffer, and (f) receipt of a request for a data item from the device giving an address which is non-contiguous with an address of a data item last conveyed to the device.

* * * * *

UNITED STATES PATENT AND TRADEMARK OFFICE
CERTIFICATE OF CORRECTION

PATENT NO. : 4,821,185

DATED : April 11, 1989

INVENTOR(S) : Daniel Esposito

Page 1 of 3

It is certified that error appears in the above-identified patent and that said Letters Patent is hereby corrected as shown below:

In the Claims:

Column 16, line 61, "storage" (second occasion) should read --storage size--.

Column 17, line 22, "device of information seeking" should read --device seeking--.

Column 17, line 24, "receipt from a device" should read --receipt--.

Column 17, line 31, "control second means" should read --second means--.

Column 17, line 45, "destination portion" should read --destination memory portion--.

Column 17, line 61, "any of e of (a)" should read --any one of (a)--

Column 18, line 21, "device stored" should read --device and stored--.

Column 18, line 43, "the o device" should read --the one device--.

Column 19, line 16, "obtain" should read --obtaining--.

Column 19, line 55, "t a destination" should read --to a destination--.

UNITED STATES PATENT AND TRADEMARK OFFICE
CERTIFICATE OF CORRECTION

PATENT NO. : 4,821,185

DATED : April 11, 1989

INVENTOR(S) : Daniel Esposito

It is certified that error appears in the above-identified patent and that said Letters Patent is hereby corrected as shown below:

In the Claims:

Column 19, line 56, "items the" should read --items in the--.

Column 19, line 58, "a fi condition" should read --a first condition--.

Column 20, line 24, "(f) which" should read --which--.

Column 21, line 21, "and e" should read --and each--.

Column 21, line 31, "and giving" should read --giving--.

Column 22, line 53, "receive" should read --receipt--.

UNITED STATES PATENT AND TRADEMARK OFFICE
CERTIFICATE OF CORRECTION

PATENT NO. : 4,821,185

DATED : April 11, 1989

INVENTOR(S) : Daniel Esposito

It is certified that error appears in the above-identified patent and that said Letters Patent is hereby corrected as shown below:

In the Claims:

Column 23, line 5, "including" should read --including an--.

Column 23, line 15, "from t" should read --from the--.

Column 23, line 20, "address" should read --addresses--.

Column 24, line 41, "to t buffer" should --to the buffer--.

Column 24, line 48, "include" should read --included--.

Signed and Sealed this

First Day of December, 1992

*Attest:*

DOUGLAS B. COMER

*Attesting Officer*     *Acting Commissioner of Patents and Trademarks*